(12) United States Patent
Armangau

(10) Patent No.: US 6,434,681 B1
(45) Date of Patent: Aug. 13, 2002

(54) SNAPSHOT COPY FACILITY FOR A DATA STORAGE SYSTEM PERMITTING CONTINUED HOST READ/WRITE ACCESS

(75) Inventor: Philippe Armangau, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/452,964

(22) Filed: Dec. 2, 1999

(51) Int. Cl.$^7$ ............................................... G06F 12/16
(52) U.S. Cl. ........................................ 711/162; 711/202
(58) Field of Search ................................ 711/162, 202; 707/204

(56) References Cited

U.S. PATENT DOCUMENTS

| | | | |
|---|---|---|---|
| 4,608,688 A | 8/1986 | Hansen et al. .................. | 714/6 |
| 4,686,620 A | 8/1987 | Ng .............................. | 707/10 |
| 4,755,928 A | 7/1988 | Johnson et al. ................ | 714/6 |
| 5,060,185 A | 10/1991 | Naito et al. .................. | 707/202 |
| 5,206,939 A | 4/1993 | Yanai et al. ................... | 711/4 |
| 5,381,539 A | 1/1995 | Yanai et al. ................. | 711/133 |
| 5,535,381 A * | 7/1996 | Kopper ........................ | 710/52 |
| 5,673,382 A | 9/1997 | Cannon et al. ................. | 714/6 |
| 5,737,747 A | 4/1998 | Vishlitzky et al. .......... | 711/118 |
| 5,742,792 A | 4/1998 | Yanai et al. ................ | 711/162 |
| 5,829,046 A | 10/1998 | Tzelnic et al. ............. | 711/162 |
| 5,829,047 A | 10/1998 | Jacks et al. .................. | 711/162 |
| 5,915,264 A * | 6/1999 | White et al. ................. | 711/162 |
| 6,076,148 A * | 6/2000 | Kedem ........................ | 711/162 |
| 6,269,431 B1 * | 7/2001 | Dunham ....................... | 707/204 |

OTHER PUBLICATIONS

Mendel Rosenblum and John K. Ousterhout, "The Design and Implementation of a Log–Structured File System," *ACM Transactions on Computer Systems*, vol. 10, No. 1, Feb. 1992, pp. 26–52.

Fred Douglis and John Ousterhout, "Log–Structured File Systems," in Spring COMPCON89, Feb. 27–Mar. 31, 1989, Thirty–Fourth IEEE Computer Society International Conference, San Francisco, CA, pp. 124–129.

David A. Patterson, Peter Chen, Garth Gibson, and Randy H. Katz, "Introduction to Redundant Arrays of Inexpensive Disks (RAID)," in Spring COMPCON89, Feb. 27–Mar. 31, 1989, Thirty–Fourth IEEE Computer Society International Conference, San Francisco, CA, pp. 112–117.

(List continued on next page.)

*Primary Examiner*—Reginald G. Bragdon
(74) *Attorney, Agent, or Firm*—Howrey Simon Arnold & White LLP

(57) ABSTRACT

A snapshot copy of a production data set is maintained while a host may continue write access to the production data set. The data storage system responds to a host request to write to a storage location of the production data set by checking whether or not the storage-location has been modified since the time when the snapshot copy was created, and upon finding that the storage location of the production data set has not been modified, copying data from the storage location of the production data set to an allocated storage location of the snapshot copy, and after copying data from the storage location of the production data set to the allocated storage location of the snapshot copy, performing the write operation upon the storage location of the production data set. In the preferred implementation, the data storage system allocates to the snapshot copy a bit map to indicate storage locations in the production data set that have been modified, and a list of pointers to allocated storage locations for the snapshot copy. The snapshot copy facility is useful so that a host write operation upon a storage location being backed up need not be delayed until original data in the storage location is written to secondary storage. The snapshot copy facility is also useful for other applications such as transaction processing and debugging.

14 Claims, 17 Drawing Sheets

OTHER PUBLICATIONS

D.L. Burkes and R.K. Treiber, "Design Approaches for Real–Time Transaction Processing Remote Site Recovery," in Spring COMPCON90, Feb. 26–Mar. 2, 1990, Thirty–Fifth IEEE Computer Society International Conference, San Francisco, CA, pp. 568–572.

"VERITAS NetBackup and Storage Migrator" www.sun.com/stora . . . /netbackup.html; $sessionid$QEOQTDQAAC2QHAMTA1FU5Y, published at least as early as Oct. 28, 2000, 5 pages.

R. Stager and D. Hitz, Internet Draft, filename "draft–stager–iquard–netapp–backup–0.5.txt" Network Data Management Protocol (NDMP), last update Oct. 12, 1999, pp. 1–73.

"Network Data Management Protocol (NDMP)," www.ndmp.org/info/; NDMP White Paper, www.ndmp.org/info/technology/wp.html; "Protocol Specification Summary, Document Version: 1.7.2S," www.ndmp.org/info/spec summary.html; "Legato Systems Embraces the NDMP Standard: Legato Networker Software to be NDMP Compliant in Q3," www–ftp.legata.com/News/Press/PR209.html; published at least as early as Oct. 11, 1999, 17 pages.

* cited by examiner

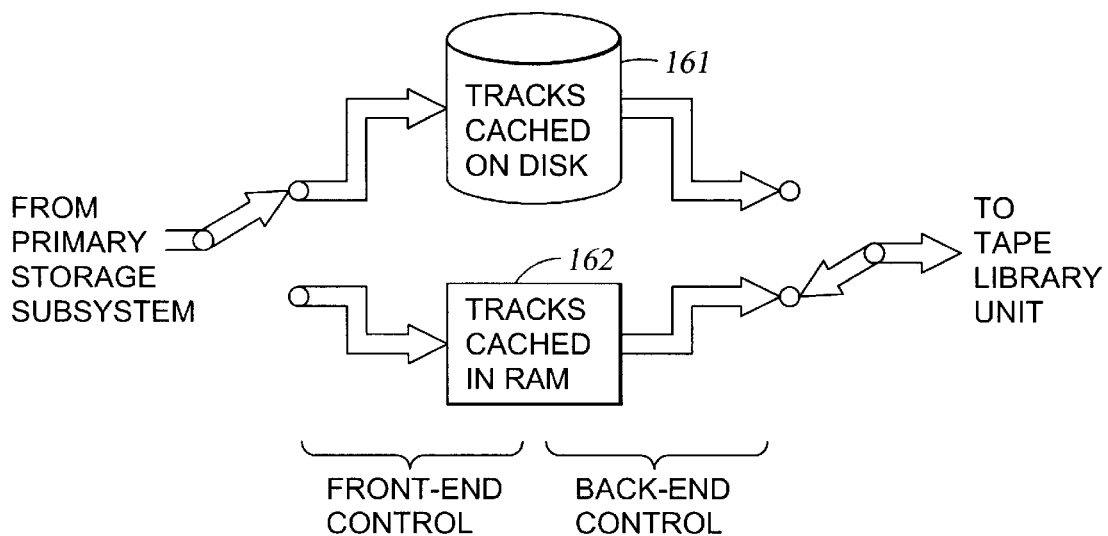
Fig. 11
| DEVICE #1 | DEVICE #2 | DEVICE #3 | DEVICE #4 |
|---|---|---|---|
| DRIVE ID | DRIVE ID | DRIVE ID | DRIVE ID |
| FIRST TRACK | FIRST TRACK | FIRST TRACK | FIRST TRACK |
| LAST TRACK | LAST TRACK | LAST TRACK | LAST TRACK |
Fig. 13
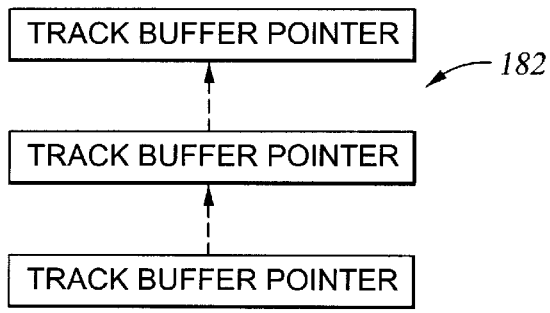
Fig. 14

SNAPSHOT COPY FACILITY FOR A DATA STORAGE SYSTEM PERMITTING CONTINUED HOST READ/WRITE ACCESS

FIELD OF THE INVENTION

The present invention relates generally to computer data storage, and more particularly, to a snapshot copy facility for a data storage system that permits continued host read/write access to data storage that has been snapshot copied.

BACKGROUND OF THE INVENTION

Snapshot copies of a data set such as a file or storage volume have been used for a variety of data processing and storage management functions such as storage backup, transaction processing, and software debugging.

A known way of making a snapshot copy is to respond to a snapshot copy request by invoking a task that copies data from a production data set to a snapshot copy data set. A host processor, however, cannot write new data to a storage location in the production data set until the original contents of the storage location have been copied to the snapshot copy data set.

Another way of making a snapshot copy of a data set is to allocate storage to modified versions of physical storage units, and to retain the original versions of the physical storage units as a snapshot copy. Whenever the host writes new data to a storage location in a production data set, the original data is read from the storage location containing the most current version, modified, and written to a different storage location. This is known in the art as a "log structured file" approach. See, for example, Douglis et al. "Log Structured File Systems," COMPCON 89 Proceedings, Feb. 27–Mar. 3, 1989, IEEE Computer Society, p. 124–129, incorporated herein by reference, and Rosenblum et al., "The Design and Implementation of a Log-Structured File System," ACM Transactions on Computer Systems, Vol. 1, February 1992, p. 26–52, incorporated herein by reference.

Backup and restore services are a conventional way of reducing the impact of data loss from the network storage. To be effective, however, the data should be backed up frequently, and the data should be restored rapidly from backup after the storage system failure. As the amount of storage on the network increases, it is more difficult to maintain the frequency of the data backups, and to restore the data rapidly after a storage system failure.

In the data storage industry, an open standard network backup protocol has been defined to provide centrally managed, enterprise-wide data protection for the user in a heterogeneous environment. The standard is called the Network Data Management Protocol (NDMP). NDMP facilitates the partitioning of the backup problem between backup software vendors, server vendors, and network-attached storage vendors in such a way as to minimize the amount of host software for backup.

The current state of development of NDMP can be found at the Internet web site for the NDMP organization. Details of NDMP are set out in the Internet Draft Document by R. Stager and D. Hitz entitled "Network Data Management Protocol" document version 2.1.7 (last update Oct. 12, 1999) incorporated herein by reference.

SUMMARY OF THE INVENTION

In practice, it has been found that the technique of storing data in logical storage volumes having relatively permanent physical storage locations in a data storage system has a competitive advantage over the more complex log structured file approach. For providing storage backup, however, the relatively permanent physical storage locations of the logical storage volumes has introduced a significant delay when host write access to storage locations containing original data is delayed until the original data are transmitted to a backup storage device. It has been found that this delay can be reduced by providing a snapshot copy facility in the data storage system. This snapshot copy facility is useful for other applications, such as transaction processing and debugging.

In accordance with a first aspect of the invention, there is provided a method of maintaining in data storage of a data storage system a snapshot copy of a production data set including a multiplicity of storage locations in the data storage. The production data set is accessible to a host processor for read/write access during maintenance of the snapshot copy. The snapshot copy includes data existing in the production data set at a time when the snapshot copy is created. The method includes the data storage system responding to a request from the host processor for a write operation upon a storage location of the production data set. The data storage system responds by checking whether or not the storage location of the production data set has been modified since the time when the snapshot copy was created, and upon finding that the storage location of the production data set has not been modified since the time when the snapshot copy was created, copying data from the storage location of the production data set to an allocated storage location of the snapshot copy, and after copying data from the storage location of the production data set to the allocated storage location of the snapshot copy, performing the write operation upon the storage location of the production data set.

In accordance with another aspect, the invention provides a method of maintaining in data storage of a data storage system a snapshot copy of a production data set including a multiplicity of storage locations in the data storage. The production data set is accessible to a host processor for read/write access during maintenance of the snapshot copy. The snapshot copy includes data existing in the production data set at a time when the snapshot copy is created. The method includes the data storage system allocating to the snapshot copy a bit map for the data set and a list of pointers, the bit map including a bit for each storage location of the production data set to indicate whether or not each storage location has been modified since the time when the snapshot copy is created. The method further includes the data storage system responding to a request from the host processor for a write operation upon a storage location of the production data set. The data storage system responds by checking the bit in the bit map for the storage location of the production data set to determine whether or not the storage location of the production data set has been modified since the time when the snapshot copy was created, and upon finding that the storage location of the production data set has not been modified since the time when the snapshot copy was created, allocating a storage location to the snapshot copy, copying data from the storage location of the production data set to the allocated storage location of the snapshot copy, placing a pointer to the allocated storage location of the snapshot copy on the list of pointers allocated to the snapshot copy, changing the bit in the bit map for the storage location of the production data set, and after copying data from the storage location of the production data set to the allocated storage location of the snapshot copy, performing the write operation upon the storage location of the production data set.

In accordance with yet another aspect, the invention provides a data storage system including data storage and at least one data processor responsive to requests from a host processor for read/write access to a production data set including multiple storage locations in the data storage. The data processor is programmed to maintain in the data storage a snapshot copy of the production data set, the snapshot copy including data existing in the production data set at a time when the snapshot copy is created. Moreover, the data processor is programmed to respond to a request from the host processor for a write operation upon a storage location of the production data set by checking whether or not the storage location of the production data set has been modified since the time when the snapshot copy was created, and upon finding that the storage location of the production data set has not been modified since the time when the snapshot copy was created, copying data from the storage location of the production data set to an allocated storage location of the snapshot copy, and after copying data from the storage location of the production data set to the allocated storage location of the snapshot copy, performing the write operation upon the storage location of the production data set.

In accordance with still another aspect, the invention provides a data storage system including data storage and at least one data processor responsive to requests from a host processor for read/write access to a production data set including multiple storage locations in the data storage. The data processor is programmed to maintain in the data storage a snapshot copy of the production data set, the snapshot copy including data existing in the production data set at a time when the snapshot copy is created. The data processor is also programmed to allocate to the snapshot copy a bit map for the data set and a list of pointers, the bit map including a bit for each storage location of the production data set to indicate whether or not each storage location has been modified since the time when the snapshot copy is created. The data processor is further programmed to respond to a request from the host processor for a write operation upon a storage location of the production data set by checking the bit in the bit map for the storage location of the production data set to determine whether or not the storage location of the production data set has been modified since the time when the snapshot copy was created, and upon finding that the storage location of the production data set has not been modified since the time when the snapshot copy was created, allocating a storage location to the snapshot copy, copying data from the storage location of the production data set to the allocated storage location of the snapshot copy, placing a pointer to the allocated storage location of the snapshot copy on the list of pointers allocated to the snapshot copy, changing the bit in the bit map for the storage location of the production data set, and after copying data from the storage location of the production data set to the allocated storage location of the snapshot copy, performing the write operation upon the storage location of the production data set.

In accordance with a further aspect, the invention provides a program storage device containing a program for a data processor in a data storage system including data storage. The data processor is responsive to requests from a host processor for read/write access to a production data set including multiple storage locations in the data storage. The program is executable by the data processor for maintaining in the data storage a snapshot copy of the production data set, the snapshot copy including data existing in the production data set at a time when the snapshot copy is created. The program is also executable by the data processor for responding to a request from the host processor for a write operation upon a storage location of the production data set by checking whether or not the storage location of the production data set has been modified since the time when the snapshot copy was created, and upon finding that the storage location of the production data set has not been modified since the time when the snapshot copy was created, copying data from the storage location of the production data set to an allocated storage location of the snapshot copy, and after copying data from the storage location of the production data set to the allocated storage location of the snapshot copy, performing the write operation upon the storage location of the production data set.

In accordance with a final aspect, the invention provides a program storage device containing a program for a data processor in a data storage system including data storage. The data processor is responsive to requests from a host processor for read/write access to a production data set including multiple storage locations in the data storage. The program is executable by the data processor for maintaining in the data storage a snapshot copy of the production data set, the snapshot copy including data existing in the production data set at a time when the snapshot copy is created. The program is also executable by the data processor for allocating to the snapshot copy a bit map for the data set and a list of pointers, the bit map including a bit for each storage location of the production data set to indicate whether or not each storage location has been modified since the time when the snapshot copy is created. Moreover, the program is executable by the data processor for responding to a request from the host processor for a write operation upon a storage location of the production data set by checking the bit in the bit map for the storage location of the production data set to determine whether or not the storage location of the production data set has been modified since the time when the snapshot copy was created, and upon finding that the storage location of the production data set has not been modified since the time when the snapshot copy was created, allocating a storage location to the snapshot copy, copying data from the storage location of the production data set to the allocated storage location of the snapshot copy, placing a pointer to the allocated storage location of the snapshot copy on the list of pointers allocated to the snapshot copy, changing the bit in the bit map for the storage location of the production data set, and after copying data from the storage location of the production data set to the allocated storage location of the snapshot copy, performing the write operation upon the storage location of the production data set.

BRIEF DESCRIPTION OF THE DRAWINGS

Additional features and advantages of the invention will be described below with reference to the drawings, in which:

FIG. 11 is a schematic diagram showing backup data flow from a primary data storage subsystem for the selective disk caching of backup data written to tape;

FIG. 13 is a schematic diagram showing a preferred construction of a record containing track pointers to tracks of backup data cached on disk storage of the secondary data storage subsystem;

FIG. 14 is a schematic diagram showing a preferred construction of a record containing track pointers to tracks of backup data cached in random access memory of a data mover in the secondary data storage subsystem;

Figure 1:
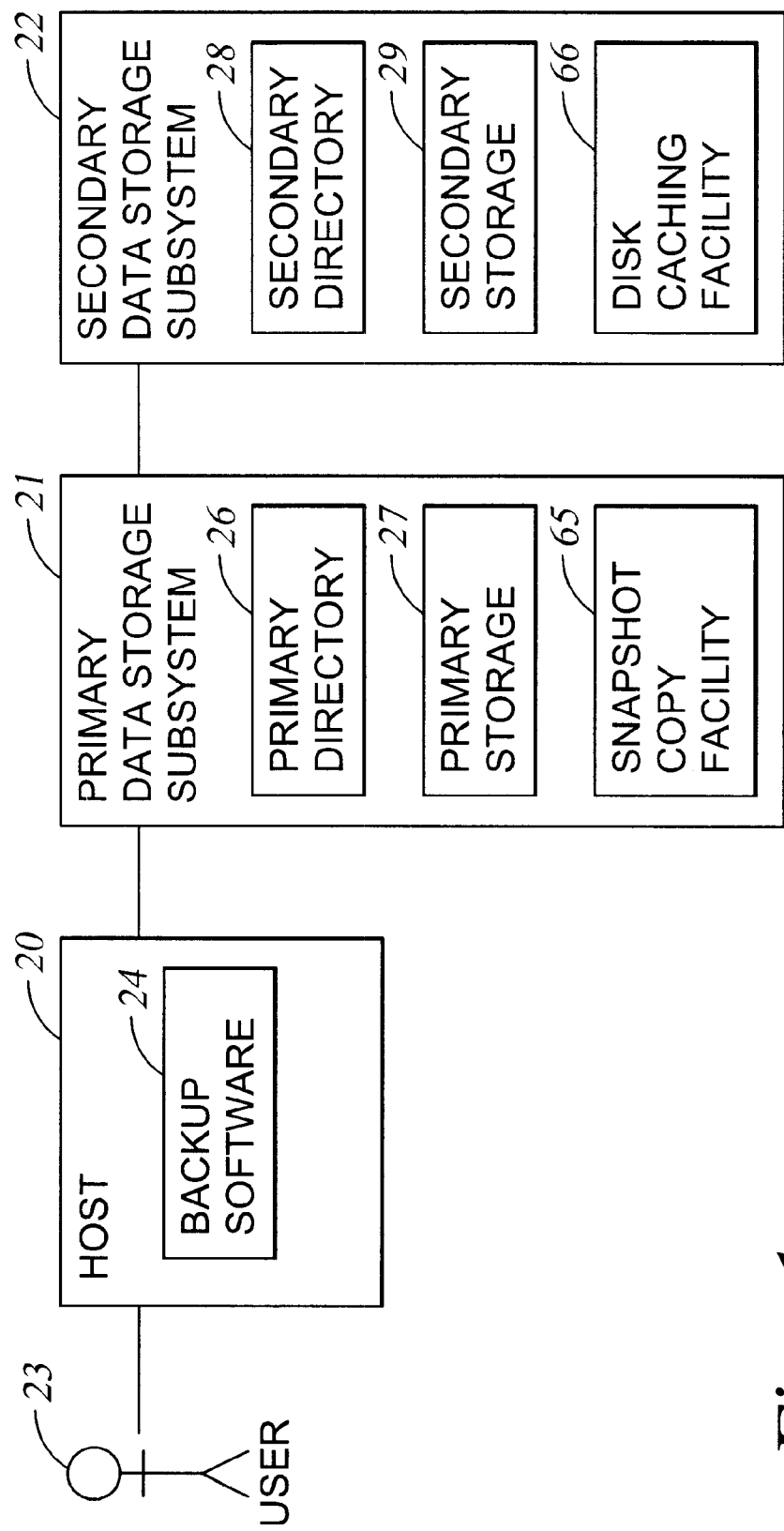
FIG. 1 is a block diagram of a data processing system in which the invention can be used.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENTS

I. Structure and Operation of the Primary and Secondary Data Storage Subsystems.

With reference to FIG. 1 of the drawings, there is shown a data processing system in which the present invention can be used. The data processing system includes a host computer 20, a primary data storage subsystem 21, and a secondary data storage subsystem 22. A user 23 operates the host computer 20, and during typical operation the host computer reads and writes to primary storage 27 in the primary data storage subsystem 21. In order to recover from a failure causing a loss of data in the primary storage 27, a backup copy of data in the primary storage 27 is kept in secondary storage 29 of the secondary data storage subsystem 22.

In the data processing system of FIG. 1, the backup data in the secondary storage 29 is not updated every time that the host 20 writes new data to the primary data storage subsystem. Instead, specified data in the primary storage 27 is copied to the secondary storage 29 when the primary data storage subsystem 21 receives a backup command from the host 20. The host 20 may issue such a backup command at the request of the user 23 or at the request of an application program being executed by the host. In either case, the host has backup software 24, which the user or the application program can invoke to cause the host to issue a backup command. The backup software 24, for example, translates requests to backup logical data structures, such as files, to backup commands that operate upon units of data storage specified in the backup commands transmitted by the host 20 to the primary data storage subsystem 21. For example, the units of data storage specified in the backup commands may include data storage volumes or devices, cylinders, and tracks.

In the context of this patent application, the term "physical storage unit" will refer to a storage unit specified by the backup commands received by the primary data storage subsystem 21. There may or may not be a one-to-one correspondence between such a physical storage unit specified in a backup command and a data storage device in the primary data storage subsystem. In the case where there is not such a one-to-one correspondence, the primary data storage subsystem will perform a mapping between the physical storage unit specified in the backup request and at least one address of a data storage device providing the primary storage 27 in the primary data storage subsystem 21.

In response to a backup command from the host 20, the primary data storage subsystem 21 accesses a primary directory 26 to find data of the physical storage unit specified by the backup command in order to initiate a process of copying the data from the primary storage 27 to the secondary storage 29 of the secondary data storage subsystem 22. Preferably, the primary directory 26 is constructed in such a way that the host can continue to access the primary storage 27 concurrently with the copying process. For example, in response to the backup command from the host 20, the primary data storage subsystem creates an "instant snapshot copy" of the specified physical storage unit, and this instant snapshot copy is protected from modification by the host 20 while the instant snapshot copy is being written to the secondary storage 29. There are a number of ways that such an instant snapshot copy can be created, depending on the way that the primary directory is organized.

One way of organizing the primary directory 26 is to associate a set of flags and mapping information with each physical storage unit, for example as described in Yanai et al., U.S. Pat. No. 5,206,939, issued Apr. 27, 1993, and incorporated herein by reference. In order to create an instant snapshot copy, a remote copy pending flag is associated with each physical storage unit. When the primary data storage subsystem 21 receives a backup command from the host 20, the primary data storage subsystem sets the remote copy pending flag, and thereafter the host can concurrently access the primary storage 27 while data is being copied from the physical storage unit to the secondary storage 29. However, before the primary data storage subsystem accesses the primary storage 27 to modify any data in response to a request from the host 20, the primary data storage subsystem first inspects the remote copy pending flag of the physical storage unit to be modified, and if the remote copy pending flag is set, the primary data storage subsystem must copy the data of the physical storage unit from the primary storage 27 to the secondary storage 29 and reset the remote copy flag, before modifying the data in the primary data storage subsystem. Unless there is such a request from the host for modification of data marked as "remote copy pending," the copying of data from the primary storage 27 to the secondary storage 29 is performed as a background process relative to host requests.

Another way of organizing the primary directory 26 is to maintain lists of pointers to primary storage locations of old and new versions of physical storage units. Whenever data in the primary storage is modified, the data is read from the primary storage locations containing the most current version, modified, and written to a different set of primary storage locations. This is known in the art as a "log structured file" approach. See, for example, Douglis et al. "Log Structured File Systems," COMPCON 89 Proceedings, Feb. 27–Mar. 3, 1989, IEEE Computer Society, p. 124–129, incorporated herein by reference, and Rosenblum et al., "The Design and Implementation of a Log-Structured File System," ACM Transactions on Computer Systems, Vol. 1, February 1992, p. 26–52, incorporated herein by reference. In order to create an instant snapshot copy, the primary directory 26 includes a respective remote copy pending flag associated with the pointer to each version of each physical storage unit. In response to a backup command from the host 20, the primary data storage subsystem sets the remote copy flag. Thereafter, the primary data storage subsystem can modify the data of the physical storage unit in the primary storage in the usual fashion concurrently with the copying of a snapshotted version of the data to the secondary storage, because the new version and the snapshotted version of the physical storage unit are stored in a different set of primary storage locations. Instead of being used to temporarily delay any modification access to a physical storage unit, the remote copy flag is used to indicate whether or not the set of primary storage locations associated with an old version of a physical storage unit can be de-allocated after a modification access.

After a modification access to a physical storage unit, the primary data storage subsystem 21 inspects the remote copy flag associated with the physical storage unit, and if the remote copy flag is not set, then the set of primary storage locations associated with the old version of the physical storage unit is de-allocated, for example, by placing a pointer to the set of the primary storage locations on a "free list." The de-allocated primary storage locations therefore become available for storing modified versions of physical storage units. If the remote copy flag is set, then the set of primary storage locations cannot be de-allocated until the data in the set of primary storage locations has been copied to the secondary storage 29. For example, when the remote copy flag of a set of primary storage locations is set, the pointer to the set of primary storage locations is placed on a remote copy list that is serviced as a background process relative to servicing host requests. After the data for the set of primary storage locations indicated by the pointer at the head of the remote copy list has been copied to the secondary storage 29, the set of primary storage locations is de-allocated and the pointer is removed from the head of the remote copy list.

In the preferred implementation of the data processing system of FIG. 1, the primary data storage subsystem 21 includes a snapshot copy facility 69. The snapshot copy facility 69 includes a stored program that is executed by data processors in the primary data storage subsystem as described below with reference to FIGS. 5 to 8. This stored program is a component of what is known as microcode for the primary data storage subsystem. The microcode can be down-loaded into program memory of the primary data storage subsystem from a conventional program storage device such as a floppy disk.

Regardless of how the primary directory 26 is organized and how the instant snapshot process is performed, it is possible for the secondary storage 29 to contain more than one version of backup data for the same physical storage unit. In order to distinguish between different versions of backup data for the same physical storage unit, the primary data storage subsystem 21 appends an identification tag to the backup data transmitted from the primary data storage subsystem to the secondary data storage subsystem 22. The tag, for example, is supplied by the host 20 in the backup command transmitted by the host to the primary data storage subsystem 21. The tag could also include a date-time stamp generated by the primary data storage subsystem. In the secondary data storage subsystem 22, the tag associated with each version of backup data is stored in a secondary directory 28, which further includes a record of a set of locations of the secondary storage 29 in which the version of backup data is stored.

The tag associated with each version of backup data in the secondary storage 29 is used in a restore operation initiated by the backup software 24 in response to the user 23 or in response to a call from an application program executed by the host 20. The backup software 24 issues a restore command to the primary data storage subsystem 21, and the restore command contains the tag of a backup version to be restored. The primary data storage subsystem forwards the restore command to the secondary data storage subsystem 22. In response to the restore command, the secondary data storage subsystem accesses the secondary directory 28 to find the secondary storage locations containing the version of backup data identified by the tag, and then copies the version of backup data from the secondary storage 29 to the primary storage 27. Therefore, the version of the backup data identified by the tag becomes the current version in the primary storage 27. The primary data storage subsystem then transmits an acknowledgment of completion of the restore operation to the backup software 24 of the host 20.

The primary storage 27 and the secondary storage 29 may contain various kinds of data storage devices such as dynamic or static random access memory, magnetic or optical disk data storage, and magnetic or optical tape data storage. As will be further described below with reference to FIG. 3, the primary data storage subsystem 21, for example, is a cached disk data storage subsystem including a random access cache memory and magnetic disk data storage. As further described below with reference to FIG. 4, the secondary data storage subsystem 22, for example, includes a tape library unit containing a multiplicity of magnetic tape cassettes providing the secondary storage 29, and the secondary data storage subsystem 22 may also include a random access cache memory and magnetic disk memory for buffering backup data transferred between the primary data storage subsystem 21 and the secondary data storage subsystem 22, and for storing the information contained in the secondary directory 28. In the preferred implementation, the secondary data storage subsystem includes a disk caching facility 66 for selectively buffering the backup data to be written to tape, as described below with reference to FIGS. 9 to 16.

Although the data processing system of FIG. 1 is shown to include a single user 23, a single host 20, a single primary data storage subsystem 21, and a single secondary data storage subsystem 22, it should be appreciated that economies of scale in the construction of the data storage subsystems provide an incentive for a multiplicity of hosts to share a primary data storage subsystem, and for a multiplicity of primary data storage subsystems to share a secondary data storage subsystem. Such a data processing system is shown in FIG. 2.

Figure 2:
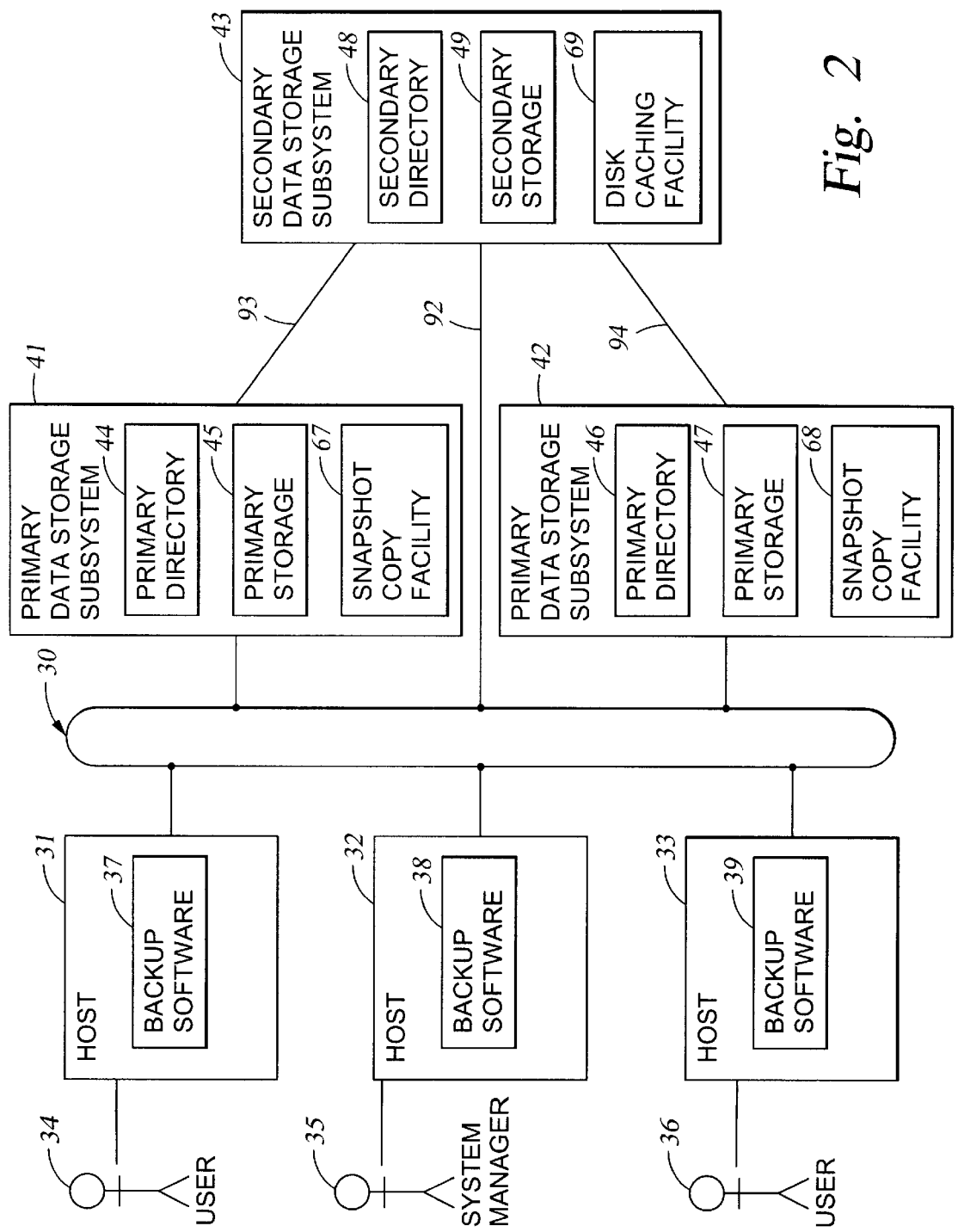
FIG. 2 is a block diagram of a more complex data processing system in which the invention can be used.

With reference to FIG. 2, a data network 30 such as a Fibre Channel loop links a multiplicity of hosts 31, 32, 33 to a number of primary data storage subsystems 41, 42. The hosts 31, 32, 33, for example, are workstations of respective users 34, 35, 36. The user 35 is a system manager responsible for configuring the data storage subsystems 41, 42 and ensuring that the data storage and backup needs of the users are satisfied. Each of the hosts has a copy of backup software 37, 38, 39 similar to the backup software 24 described above with reference to FIG. 1. The primary data storage subsystems 41,42 each have a respective primary directory 44, 46, respective primary storage 45, 47, and respective snapshot copy facilities 67, 68. The primary data storage subsystems 41, 42 are each similar to the primary data storage subsystem 21 of FIG. 1. The primary data storage subsystems 41, 42 share a secondary data storage subsystem 43. The secondary data storage subsystem 43 has a secondary directory 48, secondary storage 49, and a disk caching facility 69. The secondary data storage subsystem 43 is similar to the secondary data storage subsystem 22 of FIG. 1, but it further includes independent, dedicated data links 93 and 94 to each of the primary data storage subsystems 41 and 42, and a data link 92 to the data network 30. The dedicated links 93, 94 are used for transferring backup data between the respective primary data storage subsystems 41, 42 and the secondary data storage subsystem 43. The data link 92 permits the system manager 35 to access the secondary data storage subsystem 43 for data storage management and diagnostic purposes.

In a preferred implementation, most of the intelligence for backup functions is programmed into the secondary data storage subsystem 43 so as not to significantly reduce the data processing resources of the primary data storage subsystems 41, 42 that are available for processing host read/write operations to production volumes. For example, in the preferred implementation using NDMP compliant backup software 31, 32, 33, the NDMP commands from the backup software pass through a primary data storage subsystem and are received and executed by the secondary data storage subsystem with the exception of a backup or restore command. A backup or restore command is recognized by a port adapter of a primary data storage subsystem upon receipt in order to maintain synchronization with any immediately following read/write operation upon a production volume being backed up or restored. In other words, if a command to backup a production volume is immediately followed by a read/write command upon the production volume, then the backup command should be performed upon the production volume version existing prior to any modification performed in response to the read/write command. In a similar fashion, if a command to restore a production volume is immediately followed by a read/write command upon a production volume, then the read/write operation should be performed upon the version of the production volume having been restored from the secondary storage.

Figure 4:
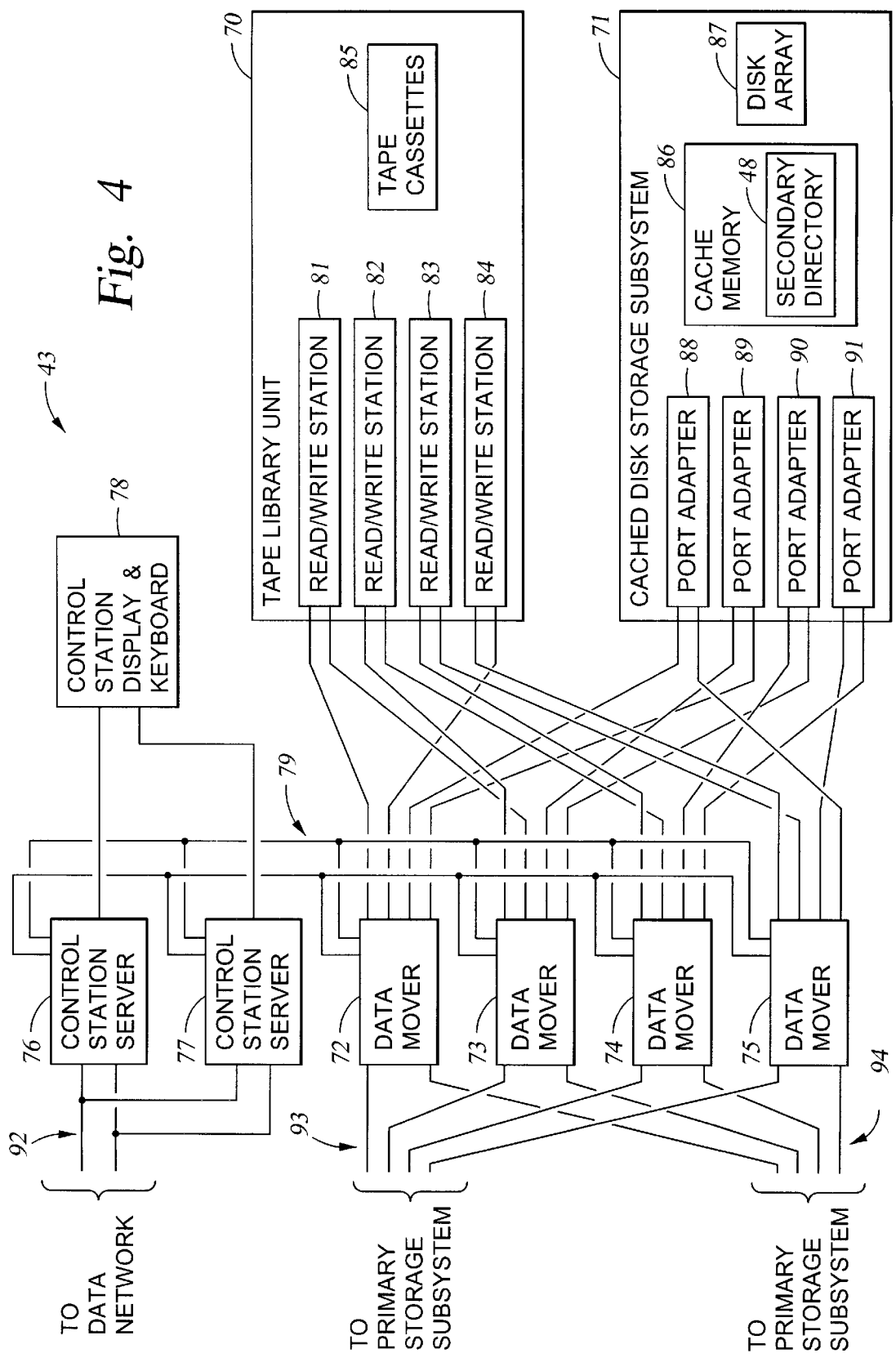
FIG. 4 is a block diagram of a preferred construction for the secondary data storage subsystem in the data processing system of FIG. 2.

In a preferred implementation, NDMP commands that pass through a primary data storage subsystem to the secondary storage subsystem are received by one of the data movers (72, 73, 74, 75) and are passed over the internal bus 79 to the active control station server 76, 77 for execution (See FIG. 4). In this fashion, the active control station can function as an NDMP server. For protection against failure of the secondary storage subsystem, the control station servers 76, 77 could be connected via the data network link 92 to a remote server (not shown) that would receive the NDMP commands, control station backup related commands, and secondary directory information from the active controller server, in order to permit the remote server to maintain a duplicate secondary directory. In this fashion, the remote server could function as a redundant NDMP server that could respond to requests for secondary directory information and could help recover from a failure of the secondary storage subsystem.

Figure 3:
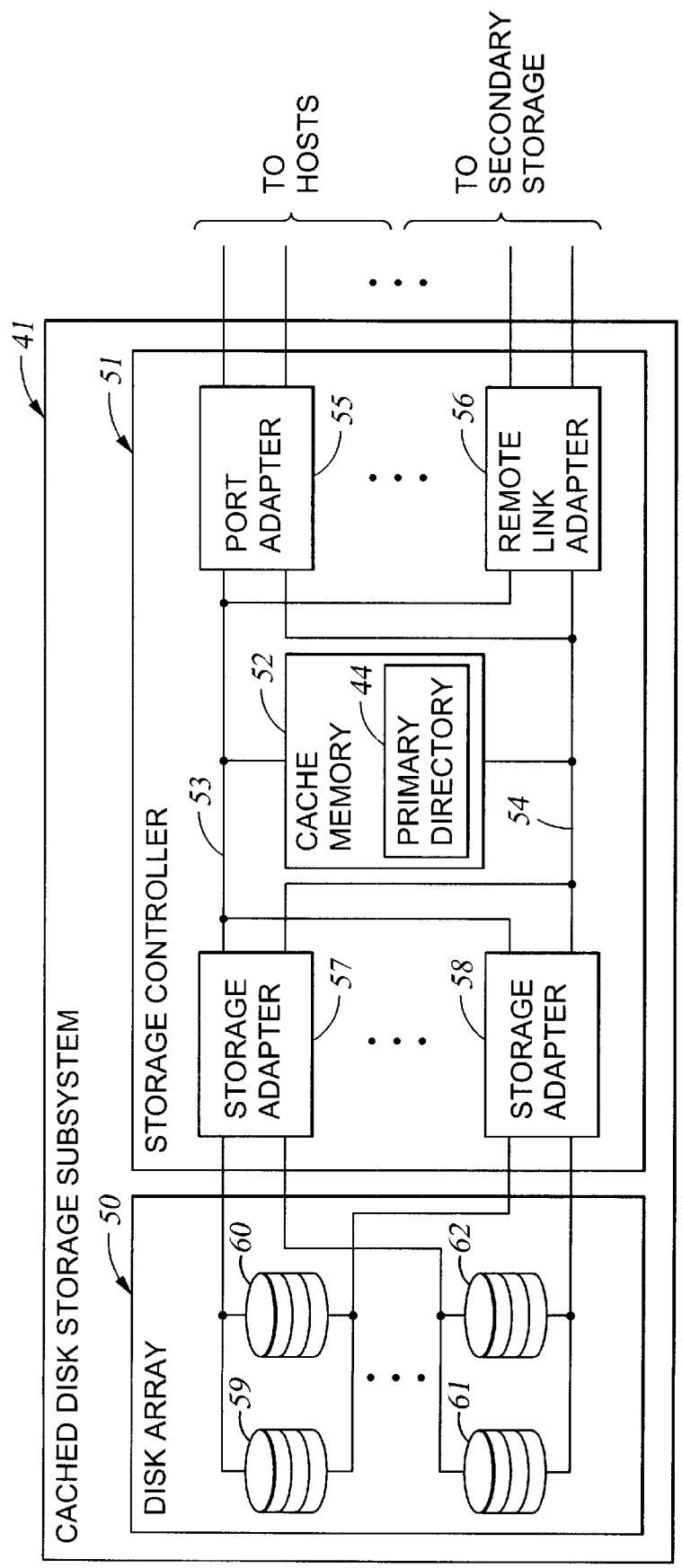
FIG. 3 is a block diagram of a preferred construction for the primary data storage subsystem in the data processing system of FIG. 2.

With reference to FIG. 3, there is shown a preferred construction for the primary data storage subsystems in the data processing system of FIG. 2. The primary data storage subsystem 41 is a cached disk data storage subsystem including a disk array 50 and a data storage controller 51 for controlling access of the hosts to the disk array. The disk array includes a multiplicity of magnetic disk drives 59, 60, 61, 62. Using current technology, each of the disk drives has a data storage capacity of at least 47 gigabytes, and the primary data storage subsystem provides at least 20 terabytes (TB) of data storage.

The data storage controller 51 includes a dual port cache memory 52, a number of port adapters 55, a number of remote link adapters 56, and a plurality of storage adapters 57, 58. The cache memory 52 is accessed via any one of two back-plane busses 53, 54. Each port adapter 55 links the hosts, via the network 30 in FIG. 2, to each of the two back-plane busses 53, 54. Each remote link adapter 56 links the secondary data storage subsystem to each of the two back-plane busses. Each of the storage adapters 57, 58 links a respective set of the disk drives 59, 60, 61, 62 to each of the two back-plane busses 53, 54. For example, the cached disk data storage subsystem includes up to eight storage adapters, and a total of up to eight port or remote link adapters. Each port adapter provides two independent data ports to the data network, and each remote link adapter provides two independent data ports to one or two secondary data storage subsystems.

When a port adapter 55 receives a data storage access request from one of the hosts (31, 32, 33 in FIG. 2), the port adapter accesses the primary directory 44 in the cache memory 52 to determine whether or not the data to be accessed resides in the cache memory. If the data to be accessed resides in the cache memory, then the port adapter accesses the data in the cache memory. If the data to be accessed does not reside in the cache memory, then the port adapter forwards a data storage access request to the storage adapters 57, 58. One of the storage adapters 57, 58 responds to the data storage access request by performing a mapping to determine where the data to be accessed resides on the data storage devices, and reads the data from the data storage devices and writes, the data to the cache memory, for access by the port adapter. The storage adapters 57, 58 also perform a write-back operation to ensure that data written to the cache memory 52 by the port adapters eventually becomes written to the disk array 50.

The cache memory 52 ensures that data frequently accessed by the hosts is likely to be found in cache in order to avoid the data access time of the disk drives and in order to minimize loading on the storage adapters and the port adapters. Consolidation of network data storage into a large cached data storage subsystem provides a benefit that cache resources are consolidated into one large cache, which is more efficient than a number of smaller caches having in total the same cache memory capacity. A large cache is more likely to contain the most recently accessed data than the combined cache memory of the smaller caches.

The data storage subsystem 41 is constructed for high data availability so that a single high-capacity data storage subsystem is at least as fault-tolerant as a local collection of conventional network data storage servers. Fault tolerance is ensured by dual redundant components and busses in the path from each port adapter 55 to any one of the disk drives 59, 60, 61, 62. Mirroring or RAID (redundant array of inexpensive disks) techniques ensure that the storage adapters 57, 58 can recover data in the event of failure of any one of the disk drives. See, for example, Patterson et al., "Introduction to Redundant Arrays of Inexpensive Disks (RAID)," COMPCON 89 Proceedings, Feb. 27–Mar. 3, 1989, IEEE Computer Society, p. 112–117, incorporated herein by reference. In a similar fashion, the data network (30 in FIG. 2) can be made fault tolerant by ensuring that each of the hosts (31, 32, 33) has more than one independent path through the data network 30 to each of two port adapters in the data storage subsystem 41. For example, the data network 30 in FIG. 2 could have dual redundant Fibre-Channel loops, only one being shown in FIG. 2.

In a preferred form of construction, the cache memory 52 is composed of dynamic RAM memory cards mounted in a card-cage or main-frame, and the port adapters and storage adapters are programmed micro-processor cards that are also mounted in the card-cage or main-frame. Each port adapter 55 has one or more processors for handling the communication protocol of the data network (30 in FIG. 2) and communicating with the cache memory busses 53, 54. Each remote link adapter 56 has one or more processors for handling a communications protocol with the secondary data storage subsystem. Each storage adapter 57, 58 has one or more processors for handling the communication protocol of the disk drives and for communicating with the cache memory busses 53, 54. For example, the links between the storage adapters 57, 58 and the disk drives are FWD (fast, wide, differential) SCSI or Fibre Channel fiber-optic loops, the port adapters 55 are programmed to communicate with the network and hosts via Bus and Tag CKD, ESCON, or SCSI protocols, and the remote link adapters 56 are programmed to communicate with the secondary data storage subsystem using the ESCON protocol.

Further details regarding the preferred construction and operation of the cached disk data storage subsystem 41 are disclosed in Yanai et al., U.S. Pat. No. 5,206,939, issued Apr. 27, 1993; Yanai et al. U.S. Pat. No. 5,335,352, issued Aug. 2, 1994; and Yanai et al. U.S. Pat. No. 5,381,539, issued Jan. 10, 1995; all incorporated herein by reference. The operation of the remote link adapter 56 is further described in Yanai et al., U.S. Pat. No. 5,544,347 issued Aug. 6, 1996, incorporated herein by reference, and in Yanai et al., U.S. Pat. No. 5,742,792 issued Apr. 21, 1998 (Ser. No. 08/654,511 filed May 28, 1996), incorporated herein by reference. Yanai et al. U.S. Pat. Nos. 5,544,347 and 5,742,792 describe the use of the remote link adapter for automatic remote mirroring of data. The use of the remote link adapter for backup of data is similar to the use of the remote link adapter for automatic remote mirroring of data with the exception that automatic remote mirroring of data need not maintain multiple versions of data in the secondary storage and therefore need not use a tag for identifying any particular version of the mirrored data.

Referring to FIG. 4, there is shown a block diagram of a preferred construction of the secondary data storage subsystem 43 in FIG. 2. As shown in FIG. 4, the secondary data storage subsystem includes a tape library unit 70, a cached disk data storage subsystem 71, a plurality of data mover computers 72, 73, 74, 75, dual redundant control station server computers 76, 77, and a control station display and keyboard 78. The data mover computers 72–75 and the control station server computers 76–77 are linked for transfer of control and status information by a dual redundant 10-Base-T bus 79.

The tape library unit 70 has a plurality of read-write stations 81, 82, 83, 84 and a robotic mechanism (not shown) for mounting and unmounting magnetic tape cartridges onto the read-write stations and removing or inserting the tape cartridges from slots in data storage shelves. The robotic mechanism operates automatically in response to mount, unmount, read, and write commands received by the read/write stations. The tape library unit 70, for example, is an ATL (Trademark) brand of tape library unit.

The cached disk data storage subsystem 71 includes a cache memory 86 providing a secondary directory 48 for the secondary data storage subsystem 43, a disk array 87, and a plurality of port adapters 88, 89, 90, and 91. The cached disk data storage subsystem 71 is similar to the data storage subsystem shown in FIG. 3, except that it need not have a remote link adapter. The cached disk data storage subsystem 71, for example, is a SYMMETRIX (Trademark) brand of data storage subsystem, sold by EMC Corporation, 171 South Street, Hopkinton, Mass., 01748.

The data mover computers 72–75 and the control station servers 76–77 are commodity personal computers. The data mover computers 74, 75 provide a front-end for the secondary data storage subsystem 43, and they are programmed to respond to backup and restore commands from the primary data storage subsystems. In response to a backup request, a front-end data mover computer 74, 75 moves the backup data to the cached disk data storage subsystem 71, updates the secondary directory 48, and initiates the transfer of the backup data from the cached disk data storage subsystem 71 to the tape library unit 70. The actual transfer of the backup data from the cached disk data storage subsystem 71 to the tape library unit 70 is performed by one of the back-end data mover computers 72, 73. In response to a restore request, a front-end data mover computer 74, 75 accesses the secondary directory 48 to determine the most accessible source of the backup data (cache memory 86, disk array 87, or tape cassettes 85), and accesses the backup data from the cache memory 86 or the disk array 87, or if the backup data is not accessible from the cache memory 86 or the disk array 87, the front end data mover sends a command over the 10-Base-T bus 79 to one of the back-end data mover computers 72, 73 to read the backup data from the tape cassettes and transfer the data from the tape cassettes to the cache memory 86 in the cached disk data storage subsystem 71. Once at least a portion of the backup data has been transferred from tape 85 to the cache memory 86, the front-end data mover computer 74, 75 transfers the backup data from the cache memory 86 to the primary data storage subsystem having issued the restore request.

The operation of the secondary storage subsystem is similar to that described in Vikshlitzky et al., U.S. Pat. No.

5,737,747 issued Apr. 7, 1998, incorporated herein by reference, except that the use of the cached disk data storage subsystem 71 for buffering data to be written to the tape library unit 70 has been modified. In particular, backup data from a primary storage subsystem is received by a data mover 72, 73, 74, 75, and is transmitted directly to a read/write station 81, 82, 83, 84 unless the data mover receives the backup data at a rate faster than the rate at which the data can be accepted by the read/write station and random-access buffer memory (RAM) in the data mover becomes full. If the RAM buffer of the data mover becomes full, then the backup data is cached in the cached disk storage subsystem 71. When the RAM buffer of the data mover to becomes depleted of backup data, then the data mover transfers the backup data cached in the cached disk storage subsystem 71 to the read/write station for writing to tape.

II. Snapshot Copy Facility.

As described above with reference to FIGS. 1 to 4, a primary data storage subsystem and a secondary data storage subsystem have been constructed to rapidly respond to a backup request. The primary data storage subsystem responds by performing a snapshot copy, and transferring backup data from the snapshot copy to the secondary storage subsystem.

Figure 5:
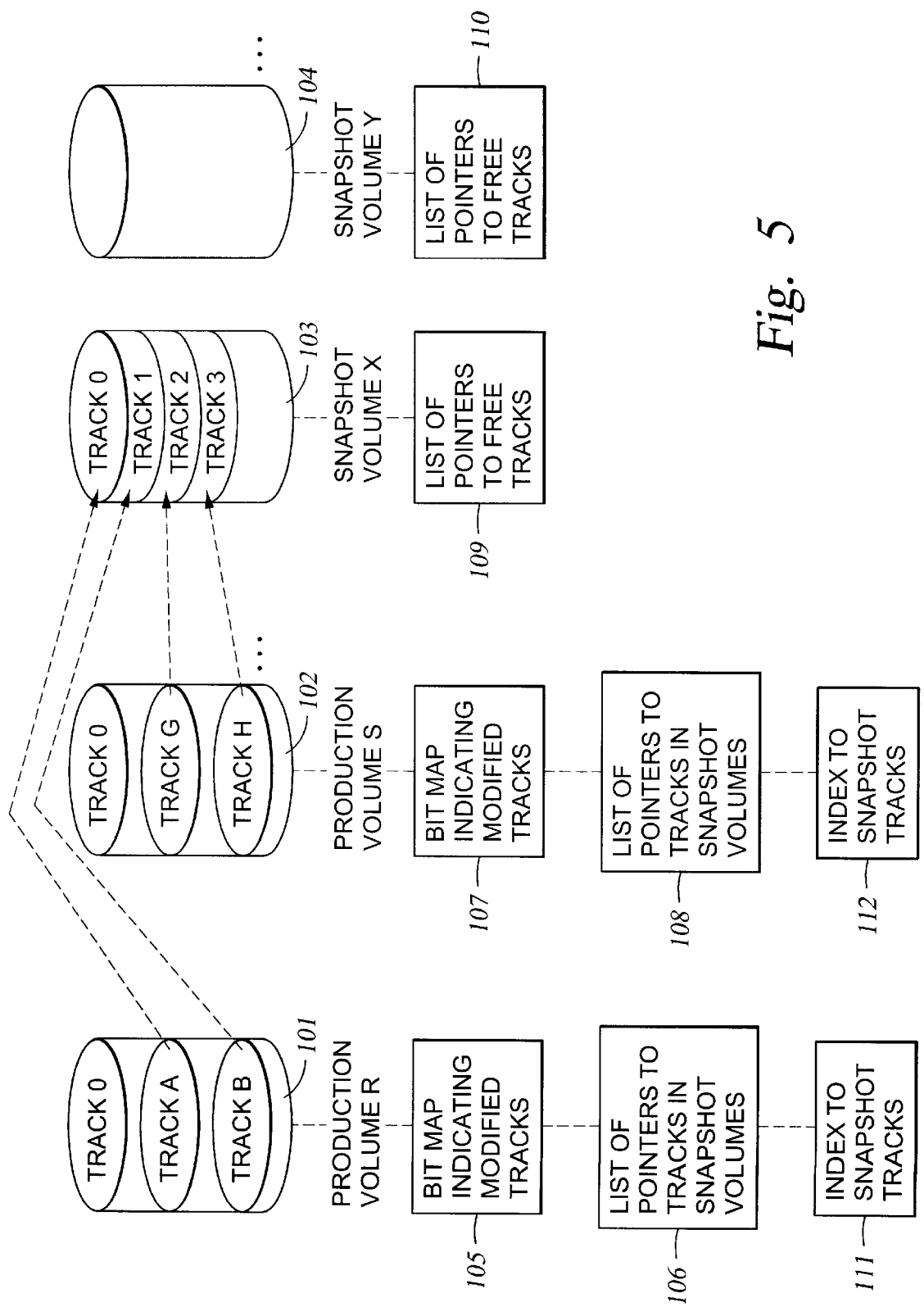
FIG. 5 is a block diagram of data structures which are included in a snapshot copy facility of the primary data storage subsystem of FIG. 1.

With reference to FIG. 5, there are shown a number of data structures that are located in the primary data storage subsystem and are used by the snapshot copy facility (69 in FIG. 1) of the primary data storage subsystem. In the example of FIG. 5, snapshot copies have been made of two production volumes 101 and 102. The snapshot copies are shown as they would exist some time after the primary storage subsystem has received a first backup command for backing up an "extent" of the production volume 101, and some time after the primary data storage subsystem has received a second backup command for backing up an extent of the production volume 102. An "extent" of a production volume is a set of contiguous tracks of the production volume, as specified, for example, by a beginning track number and an ending track number. Since receipt of the first backup command, a host has modified tracks A and B of the production volume 101, and since receipt of the second backup command, a host has modified tracks G and H of the production volume 102. Before the first modification of each track in the snapshotted production volume 101 or 102, however, the primary data storage subsystem copies the original contents of the production volume (i.e., the contents existing at the time of the snapshot) to a track in a snapshot volume 103, 104. For example, before the primary data storage subsystem modifies track A of the production volume 101, the original contents of track A are copied to track 0 of the snapshot volume 103. In a similar fashion, track 1 of the snapshot volume 103 contains the original contents of track B of the production volume 101, track 2 of the snapshot volume 103 contains the original contents of track G of the production volume 102, and track 3 of the snapshot volume 103 contains the original contents of track H of the production volume 102.

The data structures in FIG. 5 include, for each snapshotted production volume extent, a bit map 105, 107 indicating the modified tracks in the extent. The bit map is a set of bits, such as a list, table, or array, including a respective bit for each track in the extent. For example, the first bit in the bit map indicates the modified state of the first track in the extent, the second bit in the bit map indicates the modified state of the second track in the extent, etc.

The data structures in FIG. 5 also include, for each snapshotted production volume extent, a list of pointers 106, 108 to tracks in the snapshot volumes that contain original data of the snapshot. The data structures also include, for each snapshot volume, a list of pointers 109, 110 to free tracks. When a track is copied from an extent of a production volume to a snapshot volume, a pointer to the track is taken from the list of pointers to free tracks in the snapshot volume and added to the list of pointers for the extent.

When a snapshot copy of a production volume is first created, the directory to the production volume is locked to host access while the bit map and list of pointers to snapshot tracks are allocated and initialized for the snapshot copy, and then the directory is unlocked.

The data structures for the snapshot copy facility as shown in FIG. 5 permit the production volumes to be configured and indexed in the usual fashion. The tracks of the snapshot copy for an extent can be obtained by scanning the bit map for the extent and accessing the production volume for a track having its respective bit not set in the bit map, and otherwise accessing the track in the snapshot volume using a pointer from the list of pointers for the extent if the respective bit for the track is set. The data structures used by the snapshot copy facility include information associating the tracks for the extent with their respective pointers in the list.

Although not necessary for making backup copies, the data structures associated with the snapshot copy facility may include an index to the snapshot tracks for each snapshot copy of a production volume. Such an index, for example, would be desirable if the snapshot copy facility were used for providing specified snapshot data to a distributed transaction processing system. It could also be useful if it were desired to transmit snapshot copy data from the primary storage subsystem in sequential track order, or to de-allocate specified snapshot tracks. As shown in FIG. 5, for example, an index 111 is provided to locate, in the list of pointers 106, the pointer to any snapshot track containing original data from a specified track in the production volume 101. Also, an index 112 is provided to locate, in the list of pointers 108, the pointer to any snapshot track containing original data from a specified track in the production volume 102. In other words, each index 111, 112 functions as a kind of translation table, to translate a production volume track number to a corresponding snapshot volume number and snapshot volume track number.

Although the indices 111 and 112 can be constructed in various ways, in many applications only a small fraction of the production volume tracks will have corresponding snapshot volume tracks. In this situation, a conventional hash table index is an efficient implementation for the indices 111, 112. For the index 111, for example, such a conventional hash table index includes, for each possible hashing of the production volume track number, a list of pointers to corresponding entries in the list 106. Therefore, given a specified production volume track number, any corresponding snapshot track is found by hashing the production volume track number (i.e., obtaining the remainder of the division of the production volume track number by a predetermined number of possible hashings), and then searching the corresponding entries in the list 106 to locate an entry for the specified production volume track number.

Figures 6, 9:
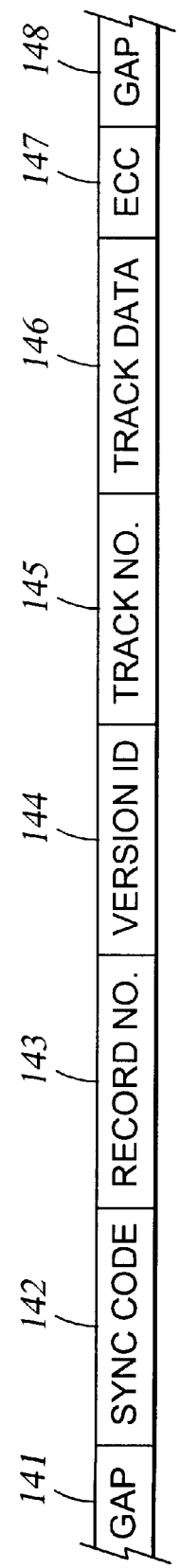
FIG. 6 is a schematic diagram of a preferred construction for a list of pointers to tracks in snapshot disks for the snapshot copy facility as shown in FIG. 5.
FIG. 9 is a schematic diagram of a format for backup data as written to tape.

As shown in FIG. 6, the list of pointers 106 includes heading information that specifies the list's production volume extent. This heading information includes a logical device number (DEVICE_NUM), a first track number for the extent (FIRST_TRACK), and a last track number for the extent (LAST$_{13}$ TRACK). Each entry in the list includes a snapshot volume number (X), a production track number (A, B), and a snapshot track number (0, 1). In this example, the list is maintained as a singly-linked list, so that the header information includes a pointer to a first entry in the list (or has a value of zero if the list is empty), and each entry in the list includes a pointer to a next entry in the list (and this pointer has a value of zero for the last entry in the list).

When the snapshot copy facility is used to facilitate backup operations, it is desirable to use a singly-linked list of pointers 106 instead of simply a list in the form of an array in order to conserve memory for the list because the length of the list is highly variable and it is possible that multiple snapshot copies may be in existence simultaneously. For example, the tape library unit has multiple read/write stations (81, 82, 83, 84 in FIG. 4) which may be writing backup data simultaneously to different respective tape cassettes, and each production volume extent is written to a respective tape cassette.

Figure 7A:
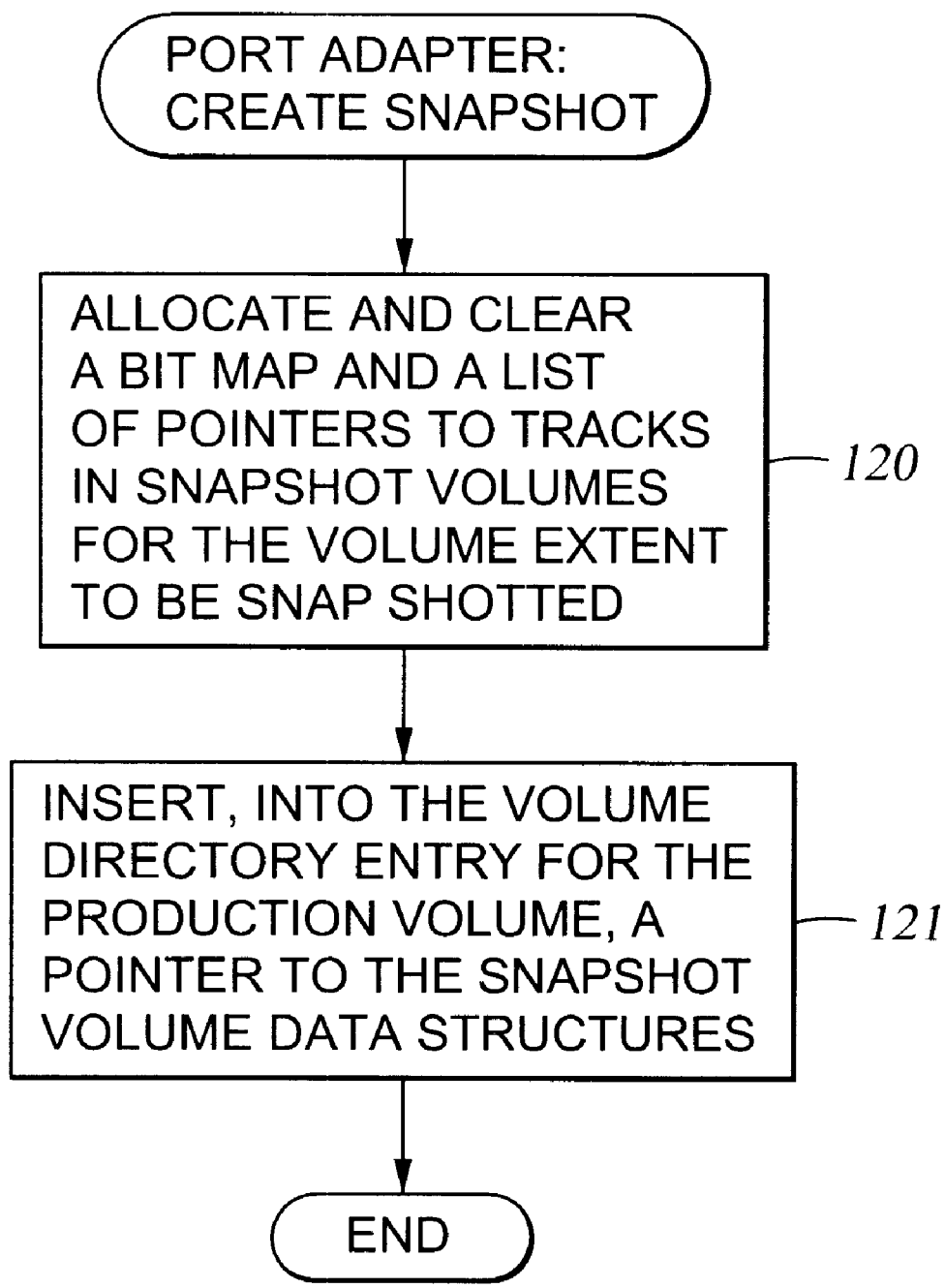
FIG. 7A is a flow chart of programming of the port adapters in the primary data storage subsystem of FIG. 3 for creating a snapshot of a production volume extent.

Referring to FIG. 7A, there is shown a flow chart of a software procedure programmed in the port adapters of a primary data storage subsystem for creating a snapshot copy of a production volume. The procedure of FIG. 7A is invoked, for example, when the port adapter receives a command from a host requesting backup of a specified production volume extent. In the first step 120 of FIG. 7A, the port adapter allocates the snapshot data structures, including a bit map and a list of pointers to snapshot tracks for the extent. An index to the pointers may also be allocated. Then in step 121, the port adapter inserts, into the volume directory entry for the production volume, a pointer to the snapshot data structures. This pointer, for example, is zero in the volume directory entry for any volume which does not have a snapshot copy. The volume directory entry could also have a field specifying a minimum track number for the production volume extent to be snapshotted, and a maximum track number for the production volume extent to be snapshotted. After step 121, the snapshot creation procedure is finished.

Figure 7B:
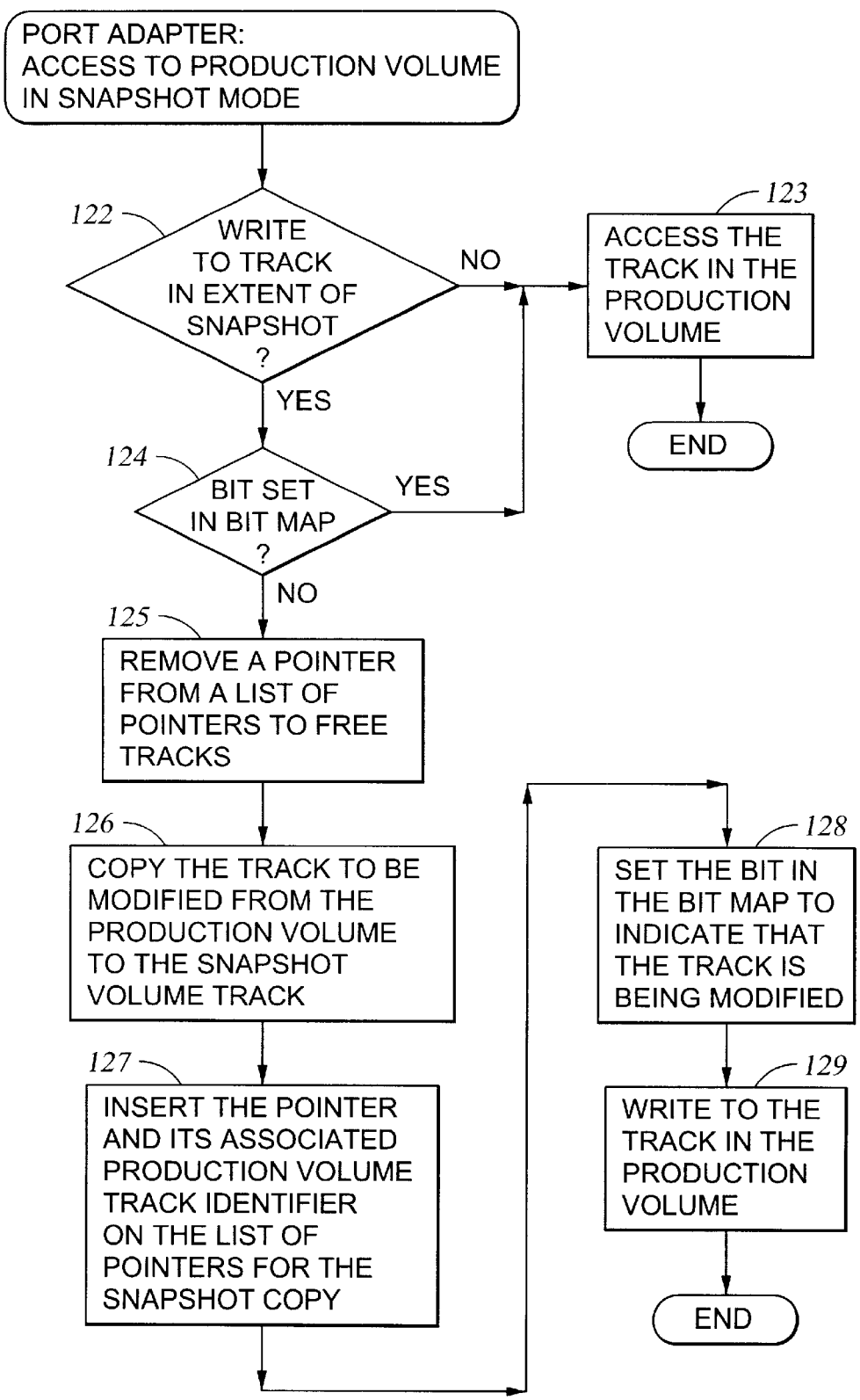
FIG. 7B is a flow chart of programming of the port adapters in the primary data storage subsystem of FIG. 3 for access to a production volume that is in a snapshot mode.

Referring to FIG. 7B, there is shown a flowchart of a software procedure programmed into the port adapters for accessing a production volume in a snapshot mode. This procedure is invoked whenever a host processor requests a write operation to a production volume for which a snapshot could have been created. In the first step 122 the port adapter checks the volume director entry to determine whether a snapshot currently exists for the production volume, and if so whether the write operation is upon a track within the production volume extent of the snapshot. If the access to the production volume is not a write to a track within the production volume extent of the snapshot, then execution branches to step 123 to access the track in the production volume, and then the procedure of FIG. 7B is finished. Otherwise, if the access to the production volume is a write to a track within the production volume extent of the snapshot, then execution continues from step 122 to step 124. In step 124, the port adapter inspects the bit for the track in the bit map for the extent. If the bit is set, then execution branches to step 123 to access the track in the production volume extent, and then the procedure of FIG. 7B is finished. Otherwise, if the bit for the track is not set in the bit map, then execution continues from step 124 to step 125. In step 125 the port adapter obtains a pointer to a free track in one of the snapshot volumes. For example, the port adapter first checks whether the list of pointers 109 for a first volume 103 is empty, and if so, it then checks the list of pointers for other snapshot volumes such as the volume 104 in FIG. 5.

Once the port adapter finds a non-empty list of pointers to free tracks of a snapshot volume, it removes a pointer from the list. In step 126 the port adapter copies the track to be modified from the production volume to the snapshot volume track specified by the pointer that was taken from the list of pointers to free tracks in the snapshot volume. In step 127 the port adapter inserts the pointer into the list of snapshot track pointers for the extent, and also inserts into this list entry an identifier for the snapshot volume and an identifier for the track in the production volume extent. Then in step 128 the port adapter sets the bit in the bit map to indicate that the track is being modified. Finally, in step 129 the port adapter writes new data to the track in the production volume. After step 129, the procedure of FIG. 7B is finished.

Figure 8A:
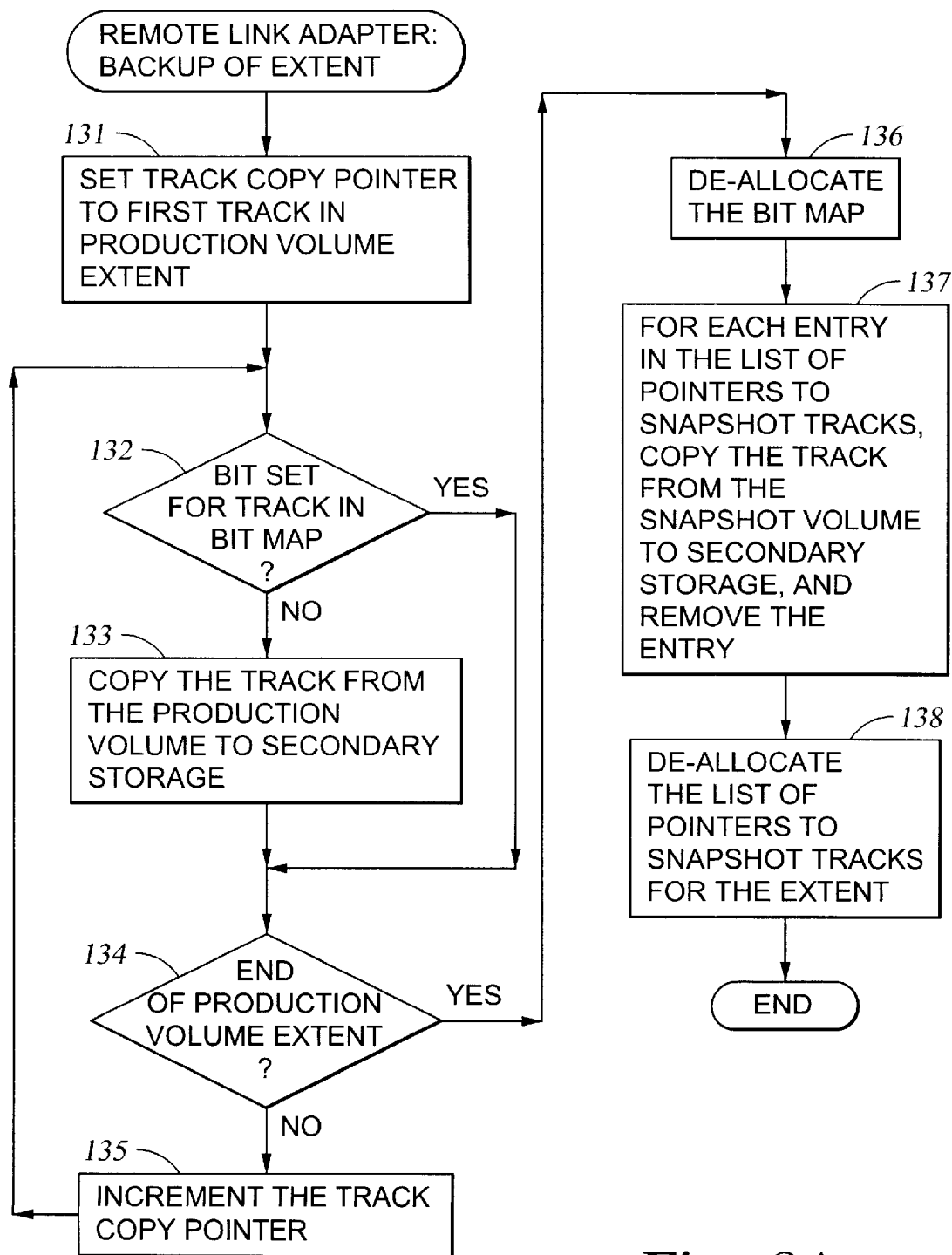
FIG. 8A is a flow chart of programming of the remote link adapters in the primary data storage subsystem of FIG. 3 for a preferred implementation of the snapshot copy facility as introduced in FIG. 5.

With reference to FIG. 8A, there is shown a flow chart of a software procedure programmed in a remote link adapter of a primary storage subsystem for implementation of the snapshot copy facility. This procedure is invoked in response to a message from a port adapter when the port adapter receives a backup command from a host. In a first step 131, the remote link adapter sets a track copy pointer to point to the first track in the production volume extent. Then in step 132 the remote link adapter checks whether the bit for the track is set in the bit map for the production volume extent. If not, then in step 133 the remote link adapter copies the track from the production volume to secondary storage. Execution continues from step 133 to step 134. Execution also branches from step 132 to step 134 when the remote link adapter finds in step 132 that the bit for the track has been set in the bit map. In step 134, the remote link adapter checks whether the track copy pointer is pointing to the end of the production volume extent. If not, execution continues from step 134 to step 135. In step 135 the track copy pointer is incremented to point to the next track in the extent, and execution loops back to step 132.

If in step 134 the remote link adapter finds that the track copy pointer is pointing to the end of the production volume extent, then execution branches to step 136. In step 136, the remote link adapter deallocates the bit map. Then in step 137, for each entry in the list of pointers to snapshot tracks, the remote link adapter copies the track from the snapshot volume to secondary storage, and removes the entry from the list. Finally, in step 138, the remote link adapter deallocates the list of pointers to snapshot tracks for the extent, and the backup operation is finished.

The remote link adapter routine of FIG. 8A may copy the tracks of snapshot data in either a synchronous fashion or an asynchronous fashion from the primary data storage subsystem to the secondary storage subsystem. If the copying is done in a synchronous fashion, the procedure in FIG. 8A would not proceed from step 133 to step 134 until the remote link adapter would receive confirmation from the secondary storage that the track has in fact been written to the secondary storage. Preferably, however, the copying is done in an asynchronous fashion, in which the track is transmitted from the production volume to secondary storage in step 133 and execution then continues to step 134 without waiting for confirmation that the that the track has been written to the secondary storage. Once the remote link adapter receives confirmation that a track has been written from the production volume to secondary storage, the bit for the track in the bit map can be set to avoid any delay if and when the host makes any write access to the production volume track before the entire production volume extent has been copied to secondary storage. Also, if a backup copy is made in an asynchronous fashion, the bit map is not deallocated in step 136 until after receipt of confirmation that all of the tracks sent from the production volume to secondary storage in step 133 have actually been written to secondary storage.

Figure 8B:
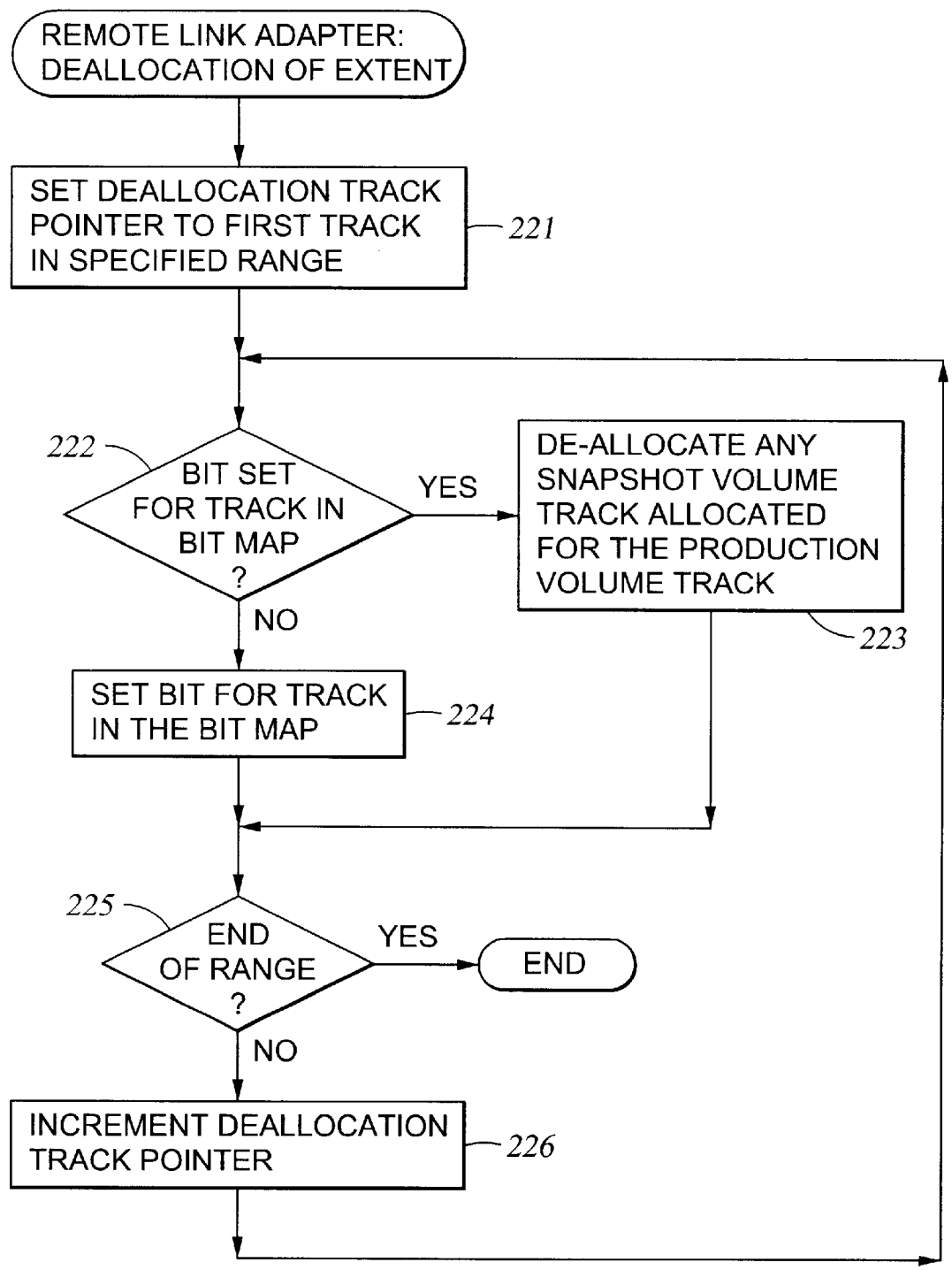
FIG. 8B is a flow chart of programming in the link adapter for responding to confirmation from the secondary storage that a remote copy has been made and a specified production volume extent can therefore be deallocated.

To facilitate backup copying to secondary storage in an asynchronous fashion, the remote link adapter can be programmed as shown in FIG. 8B to respond to a command from the secondary data storage system indicating that a range of specified tracks have been in fact copied to secondary storage and therefore the specified tracks can be deallocated from the snapshot copy. The range of specified tracks, for example, is a small subset of the tracks in the production volume extent being backed up. In this case, the command from the secondary storage is a request to "partially free" the snapshot copy. The deallocation of the specified range of tracks will prevent copying of production volume tracks in the specified range to snapshot tracks if a host subsequently writes to the tracks for the first time after the creation of the snapshot copy, and will free any snapshot volume tracks that have been allocated to production volume tracks within the specified range.

In a first step 221 of FIG. 8B, the remote link adapter sets a deallocation track pointer to the first track in the specified range of tracks. Then in step 222, execution branches depending on the state of the bit for the track in the bit map. If the bit for the track is set in the bit map, then execution branches from step 222 to step 223. In step 223, any snapshot volume track allocated for the production volume track is deallocated by removing the snapshot track pointer from the list for the snapshot volume and returning the snapshot track pointer to the free list for the snapshot volume. If in step 222 the bit for the track is not set in the bit map, then execution continues from step 222 to step 224. In step 224, the bit for the track is set in the bit map. Therefore, if a host subsequently writes to the track, a copy of the original contents of the track will not be copied to a snapshot volume track. After step 223 or 224, execution continues to step 225. In step 225, the deallocation track pointer is compared to the end of the specified range. If the deallocation track pointer is at the end of the specified range, then the procedure is finished. If not, execution continues to step 226. In step 226, the deallocation track pointer is incremented, and execution loops back to step 222.

The remote copy routine of FIG. 8A may result in a stream of tracks of backup data that is non-sequential with respect to track number. However, for a backup operation, it is not necessary for the tracks of a production volume extent to be written in sequential order to tape. In fact, as noted above, the NDMP protocol places no restriction on the format of the backup data written to tape. In the preferred embodiment of the invention, the format of the backup data on the tape is not necessarily sequential in terms of the tracks of the extent. Nevertheless, when restoring the backup data, the track numbers are determined for each track of data read from the backup tape in order to write each track of data in its proper location in the restored production volume extent.

Alternatively, the tracks can be copied from a snapshot to secondary storage in a sequential fashion. In an example of such an alternative procedure, as shown in the flow chart of FIG. 8C, the link adapter is programmed to respond to a backup request by sequentially incrementing a track copy pointer from the beginning track in a production volume extent to an ending track in the production volume extent. In a first step 241, the ink adapter sets the track copy pointer to point to the first track in the production volume extent. Then, in step 242, for the track pointed to by the track copy pointer, the link adapter indexes the bit map for the snapshot. If the bit for the track is set in the bitmap for the snapshot, then execution continues from step 242 to step 243. In step 243, the link adapter accesses the index to the snapshot tracks to translate the track number specified by the track copy pointer to a snapshot volume number and a snapshot track number. Then in step 244, the link adapter reads the snapshot track from the snapshot volume and transmits this track of backup data from the snapshot track to the secondary storage subsystem.

Figure 8C:
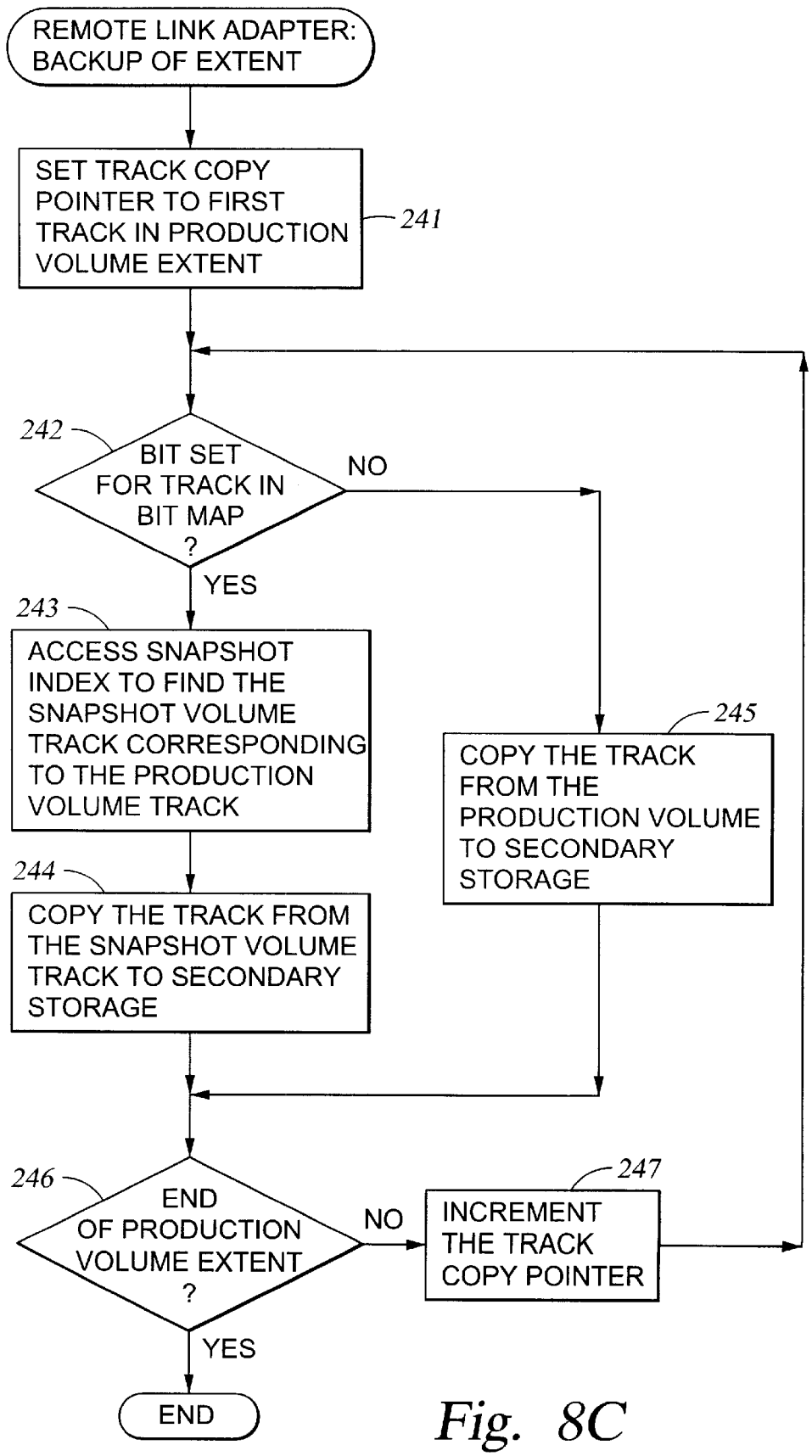
FIG. 8C is a flow chart of programming of the remote link adapters in the primary data storage subsystem of FIG. 3 for an alternative implementation of the snapshot copy facility as introduced in FIG. 5.

If the bit for the track is not set in the bit map for the snapshot, then execution branches from step 242 to step 245. In step 245, the link adapter reads the track specified by the track copy pointer from the production volume and transmits this track of backup data to the secondary storage subsystem. After step 244 or 245, execution continues to step 246. In step 246, if the track copy pointer has not reached the end of the production volume extent, then execution branches to step 247. In step 247, the track copy pointer is incremented, and execution loops back to step 242. Once the track copy pointer reaches the end of the production volume extent in step 246, the procedure of FIG. 8C is finished.

With reference to FIG. 9, there is shown a format of a data record on the backup tape. In accordance with a conventional tape record, the record shown in FIG. 9 includes, after an inter-record gap 141, a synchronization code 142, a record number 143, record data (fields 144, 145, and 146), and finally an error correction code 147 preceding another inter-record gap 148. Since the records on the backup tape are not necessarily sequential by track number, it is desirable for each record to include a track number 145 in the record data. Also, it is assumed that each tape cassette will include data from only one production volume extent. It is possible, however, that a tape cassette could be used, at various times, to store more than one version of data from the same production volume extent. Therefore, it is also desirable for the data of the record on tape to include a version identifier 144, such as a date/time stamp when the snapshot copy was made. As shown in FIG. 9, the data portion of the record on the backup tape includes the version identifier 144 followed by the track number 145 and track data 146.

It is also possible to use a record format on the backup tape that does not include a track number in each data record. For example, a correspondence table of track numbers and record numbers could be written at the beginning and/or the end of the tape.

III. Computer Data Storage Backup with Flow Control for Selective Disk Caching of Data Written to Tape.

Figure 10:
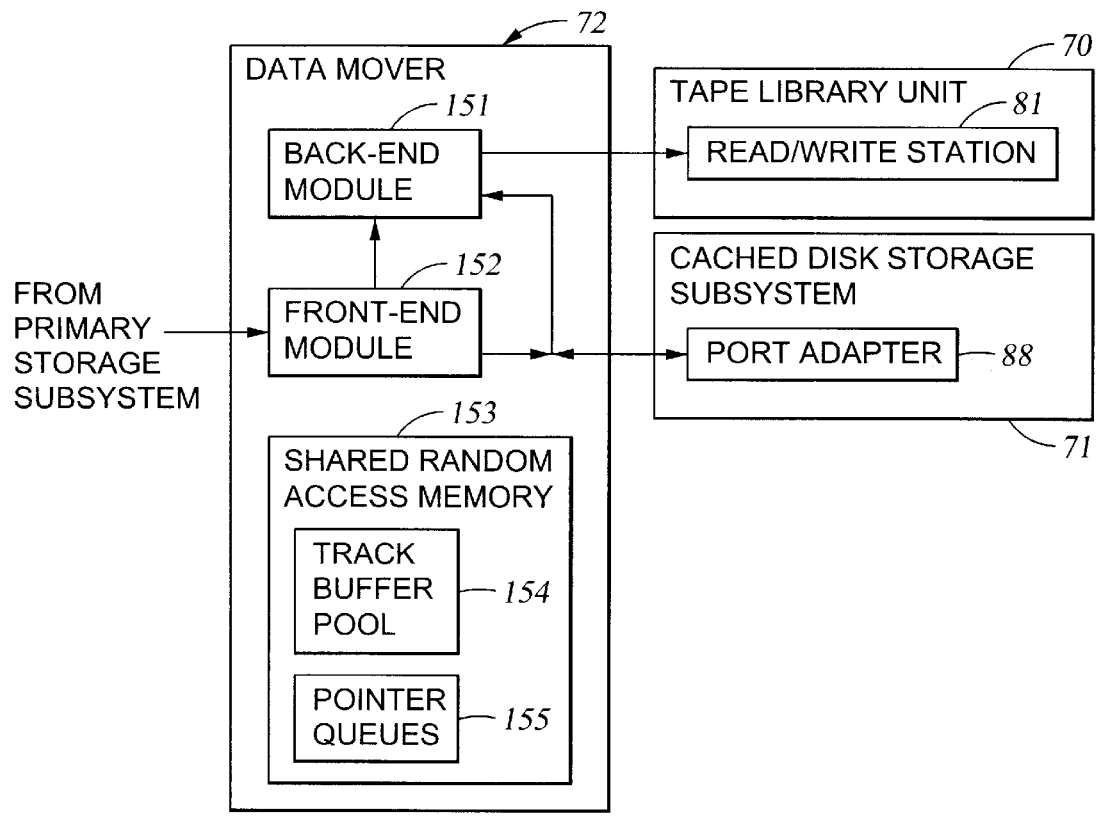
FIG. 10 is a block diagram of components in a data mover of the secondary data storage subsystem of FIG. 4 as they are used for selective disk caching of backup data written to tape.

With reference to FIG. 10, there is shown a schematic diagram of the flow of backup data through a data mover 72. Backup data from the primary storage subsystem for a production volume extent is received by a front end module 152 in the data mover 72 and either passed directly to a back-end module 151 or cached in the cache disk storage subsystem 71 for transfer at a later time to the back end module 151. The back end module 151 then writes the data to a read/write station 81 of the tape library unit 70. The front-end module 152 and the back-end module 151 share random access memory 153 of the data mover 72 including a track buffer pool 154 and pointer queues 155. The pointer queues point to track buffers in the track buffer pool 154 or tracks of data stored in the cache disk storage subsystem 71. The front-end module 152 and back-end module 151 are implemented as software programs resident in a program storage device, such as a hard magnetic disk drive, of the data mover computer 72. During operation of the data mover computer 72, these software programs are loaded into the random access memory 153 of the data mover computer 72 for execution by the data mover computer.

With reference to the data flow diagram of FIG. 11, the front-end module selectively stores the incoming backup data on disk 161 in the cache disk storage subsystem (71 in FIG. 10) or in random access memory 162 in the shared random access memory (153 in FIG. 10) of the data mover (72 in FIG. 10). The front-end module stores the incoming tracks from the primary storage subsystem in random access memory so long as a RAM track buffer for the extent is not full of backup data, and otherwise stores the tracks on disk. The back end control writes the tracks 161 from disk and the tracks 162 cached in RAM to the tape library unit. The back end module obtains the tracks from the random access memory 162 and if no tracks are cached in RAM then the back end module obtains any tracks 161 cached on disk.

Figure 12:
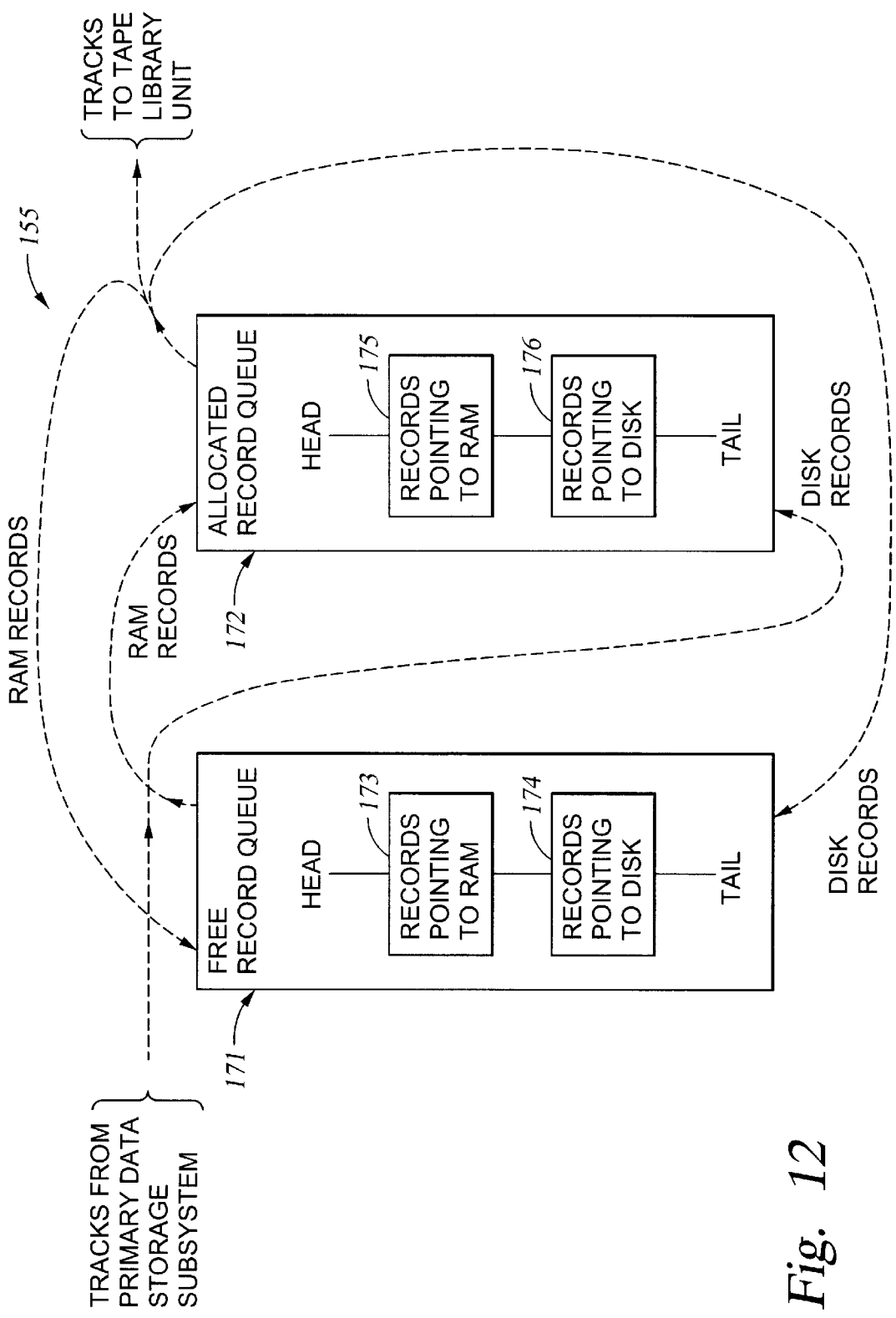
FIG. 12 is a schematic diagram showing control flow in the form of records of track pointers transferred between a free record queue and an allocated record queue for the selective disk caching of backup data written to tape in accordance with a preferred implementation.

FIG. 12 shows a preferred implementation and use of the pointer queues 155 for the disk caching facility. The pointer queues 155 include a free record queue 171 and an allocated record queue 172. The records in the queues 171, 172 are flagged as either pointing to RAM or pointing to disk. Initially, a predefined set of records pointing to random access memory 173 are inserted at the head of the free record queue 171, and a predefined set of records pointing to disk 174 are inserted at the tail of the free record queue. For example, the track size is 32 kilobytes, and each record points to up to one hundred tracks, and there are about a hundred and sixty records pointing to RAM (up to about ½ gigabyte), and there are enough records pointing to disk to store nearly a full production volume.

The allocated record queue 172 has a structure similar to the structure of the free record queue 171. If the allocated record queue 172 has records pointing to RAM 175, they appear towards the head of the allocated record queue. If the allocated record queue 172 includes records pointing to disk, they appear toward the tail of the allocated record queue. Each data mover may include a free record queue and an allocated record queue for each read/write station under its control, and at any given time the allocated record queue may include pointers to tracks for data of only a single production volume extent being backed up. Upon receipt of a command to back up an extent, the data mover allocates a read/write station under its control and its associated free record queue and allocated record queue to the backup request. The front-end of the data mover removes the record at the head of the free record queue and uses the record for determining where to store tracks from the primary data storage subsystem. The front end module stores a track in either the random access memory of the data mover if the record points to random access memory or to disk in the cached disk array of the secondary data storage subsystem if the record points to disk. The front-end module transfers the RAM records to the head of the allocated record queue, and transfers the disk records to the tail of the allocated record queue. The back-end module of the data mover removes records from the head of the allocated record queue and uses the records to determine where to obtain tracks of backup data. The back-end module obtains the tracks of data from either the random access memory of the data mover or from disk in the cached disk array of the secondary data storage subsystem, and then writes the tracks to tape. Then the back-end module returns the RAM records to the head of the free record queue 171, and the disk records to the tail of the free record queue. In this fashion, priority is given to the storage and retrieval of track data from random access memory, and intermediate disk storage is used for caching backup data to be written to tape only when free random access buffer memory is unavailable.

With reference to FIG. 13, there is shown a preferred format of a disk record 181. The disk record identifies the physical location where tracks of the backup data are to be stored in the disk memory of the cached disk storage subsystem of the secondary data storage subsystem. Each track of backup data includes a track identifier followed by the track data. The tracks of backup data are stripped across at least four disk drive devices. The disk record 181 specifies a drive identifier for each disk drive device. The record 181 also specifies the first track and the last track where the backup data is stored in each device.

With reference to FIG. 14, there is shown a preferred construction for a record pointing to random access memory. The record is organized as a queue of track buffer pointers. When a record pointing to RAM is in the free record queue, the track buffer pointer queue is empty. As tracks of data are received from the primary data storage subsystem and stored in the RAM of the data mover, pointers to the tracks of data in the RAM are inserted at the tail of the queue of track buffer pointers. As tracks are written from the RAM of the data mover to the tape library unit, corresponding track buffer pointers are removed from the head of the track buffer pointer queue. In general, for any individual record pointing to RAM or disk, the tracks are read from RAM or disk in the same sequence that they were written to RAM or disk.

Figure 15:
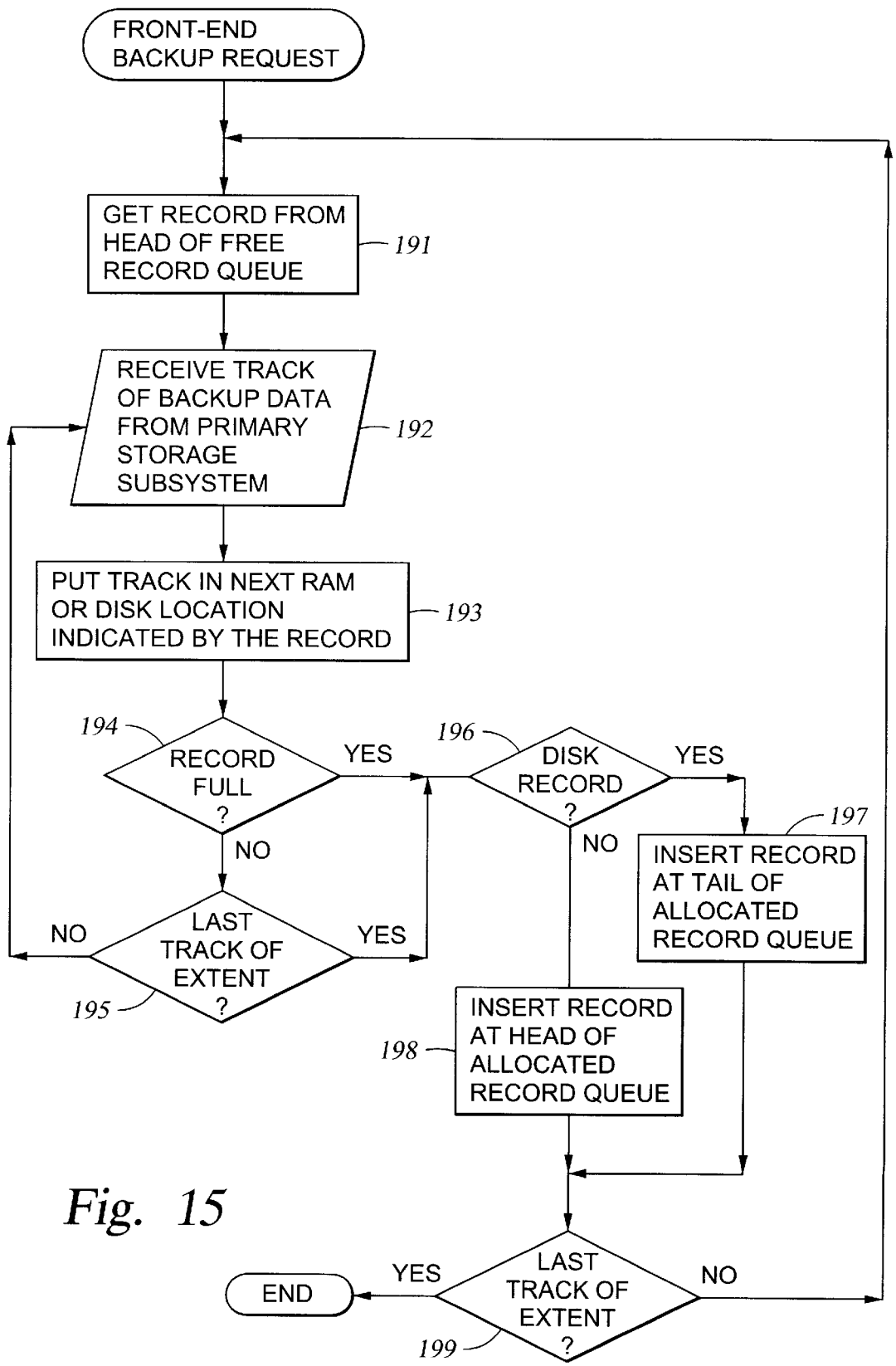
FIG. 15 is a flow chart of a front-end program module introduced in FIG. 10 for the selective caching of backup data to be written to tape.

With reference to FIG. 15, there is shown a flow chart of the software procedure programmed in the front-end module of a data mover. The procedure of FIG. 15 is invoked when the data mover receives a backup request from a primary data storage subsystem. In a first step 191, the data mover gets a record from the head of the free record queue. Then in step 192 the data mover receives a track of backup data from the primary storage subsystem. In step 193 the data mover puts the track in the next random access memory or disk location indicated by the record. In step 194, execution branches from step 194 to step 196 if the RAM or disk locations pointed to by the record have been filled with backup data. If the record is not full in this fashion, then execution continues from step 194 to step 195. In step 195, execution branches to step 196 if the data mover has received the last track for the extent. (Step 195, for example, tests a flag 10 that is set when the front-end receives the last track of the extent.) Otherwise, execution loops back from step 195 to step 192.

In step 196, execution branches to step 197 if the record is a disk record. In step 197, the data mover inserts the record at the tail of the allocated record queue. If in step 196 the record is not a disk record, then it is a RAM record and execution continues from step 196 to step 198. In step 198, the data mover inserts the RAM record at the head of the allocated record queue. After steps 197 or 198, execution continues to step 199. In step 199, if the front-end has not received the last track for the extent, then execution loops back to step 191 to receive and store more tracks of backup data from the primary storage subsystem. If in step 199 the data mover has received the last track for the extent, then the procedure of FIG. 15 is finished for the extent.

Figure 16:
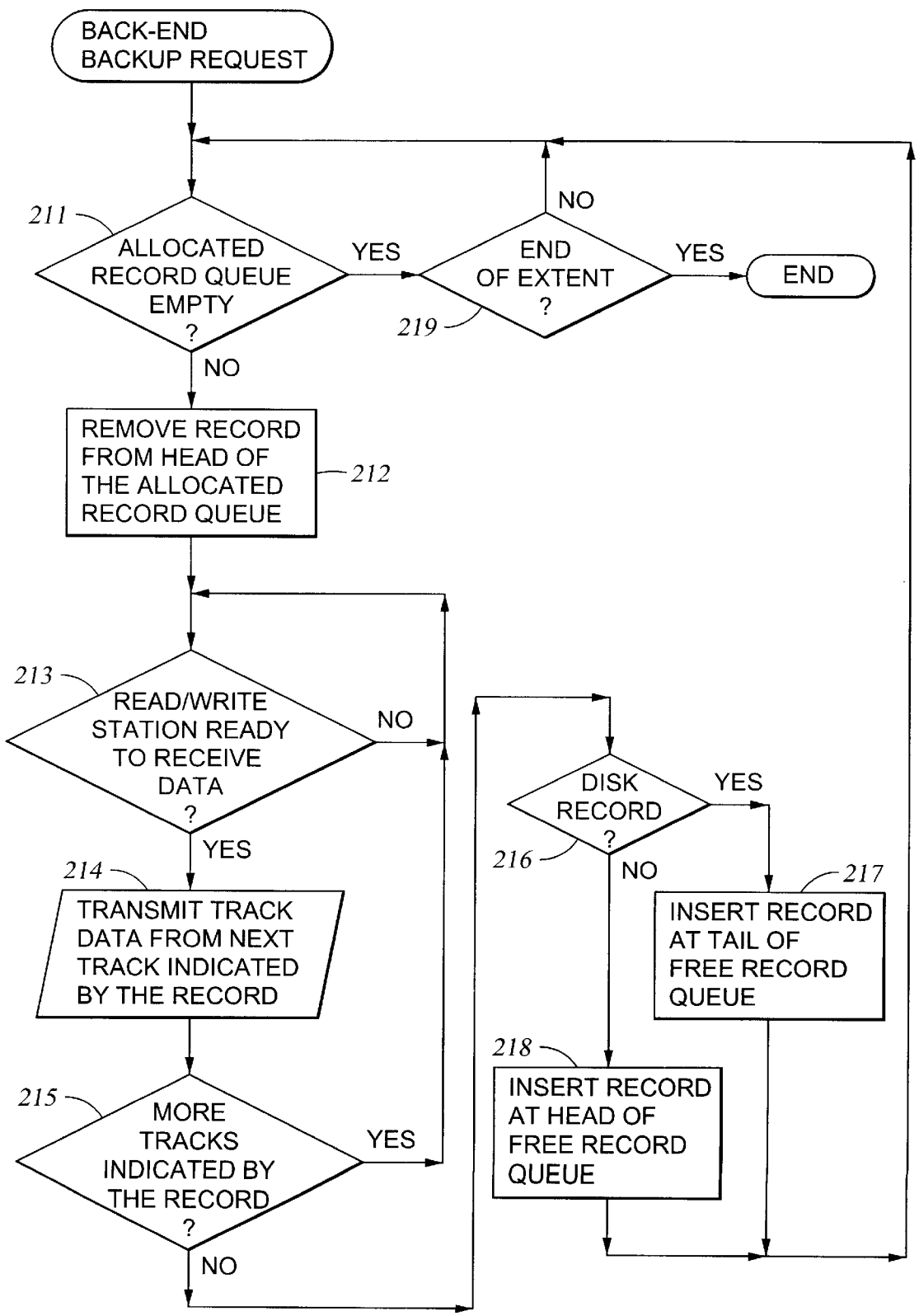
FIG. 16 is a flow chart of a back-end program module introduced in FIG. 10 for the selective caching of backup data to be written to tape.

With reference to FIG. 16, there is shown a flow chart of a software procedure programmed in the data mover for implementing the back-end module. The procedure of. FIG. 16 is invoked when the data mover receives a backup request from a primary data storage subsystem. Execution continues from a first step 211 to a second step 212 when the allocated record queue is no longer empty. In step 212 the data mover removes the record from the head of the allocated record queue. Then in step 213 execution continues to step 214 when the read/write station allocated to the extent is ready to receive data. In step 214 the data mover transmits a next track of data from either disk or RAM as indicated by the record. Then in step 215 execution branches depending on whether there are more tracks of data indicated by the record. If so, execution loops back to step 213. When there are no more tracks indicated by the record, then execution continues from step 215 to 216. In step 216, execution branches to step 217 if the record is a disk record. In step 217 the data mover inserts the record at the tail of the free record queue. Otherwise, if the record is a RAM record, execution continues from step 216 to step 218. In step 218 the data mover inserts the RAM record at the head of the free record queue. After steps 217 or 218, execution loops back to step 211. Additional tracks are sent to the read/write station until the allocated record queue 211 is empty and the end of the extent is reached in step 219. (The front end module, for example, sets a flag upon exiting from step 199 to signal to the back-end that the end of the extent has been reached, and in step 219 the back-end tests this flag.) Once the end of the extent is reached, the back-end procedure of FIG. 16 is finished.

IV. Additional Applications of Snapshot Copy Facility

As described above, the snapshot copy facility is useful in a primary storage system so that a host write operation upon a storage location of a volume extent being backed up need not be delayed until original data in the storage location is written to secondary storage. The snapshot copy facility, however, can be used for other applications such as transaction processing and debugging.

Host operating systems that support transaction processing, for example, may permit an application program to include a "check point" statement that specifies a combination of open files and results in a "commit" operation. If program operation is interrupted so that the current state of the files may be unknown, then a recovery routine can be performed that will recover the state of the files existing at the time of the last "checkpoint" statement. The recovery routine in effect performs an "abort" operation. The "checkpoint" statement, for example, is compiled as a call to an operating system routine that flushes any file buffers to storage and updates a log of modifications to storage in such a way that the state of the files at that point can be recovered even if there is a failure of the host during the flushing operation. If the failure occurs, the log indicates which files have been modified since the last checkpoint, and what the modifications were. Therefore, the log can be used to "undo" certain modifications to reconstruct the state since the last checkpoint.

The snapshot copy facility as described above can simplify considerably the implementation, host processing time, and storage requirements for the "commit" and "abort" operations. For example, the "commit" operation simply flushes any file modifications to storage, and then creates or clears a snapshot copy for each of the files. The "abort" operation checks whether the snapshots for the files have all been created or cleared in sequence, for example, by inspecting time stamps associated with each snapshot. If the snapshots for the files have not all been created or cleared in sequence, then a failure occurred during the process of creating or clearing the snapshot copies, and the recovery operation simply finishes the task of creating or resetting the snap shot copies, without any need to modify the production volume extents as they exist in storage. The snapshot is reset by returning the entries in the pointer list to the lists of pointers to free tracks, and by clearing the bit map for the snapshot. If the snapshots for the files have all been created or updated in sequence, then the production volume extents can be restored with their snapshot copies. The restoration of each production volume extent can be performed by unlinking the entries from the list of pointers to the allocated storage locations in the snapshot copy, and for each entry, copying the pointed-to allocated track in the snapshot copy to the associated track of the production volume extent.

Figure 17:
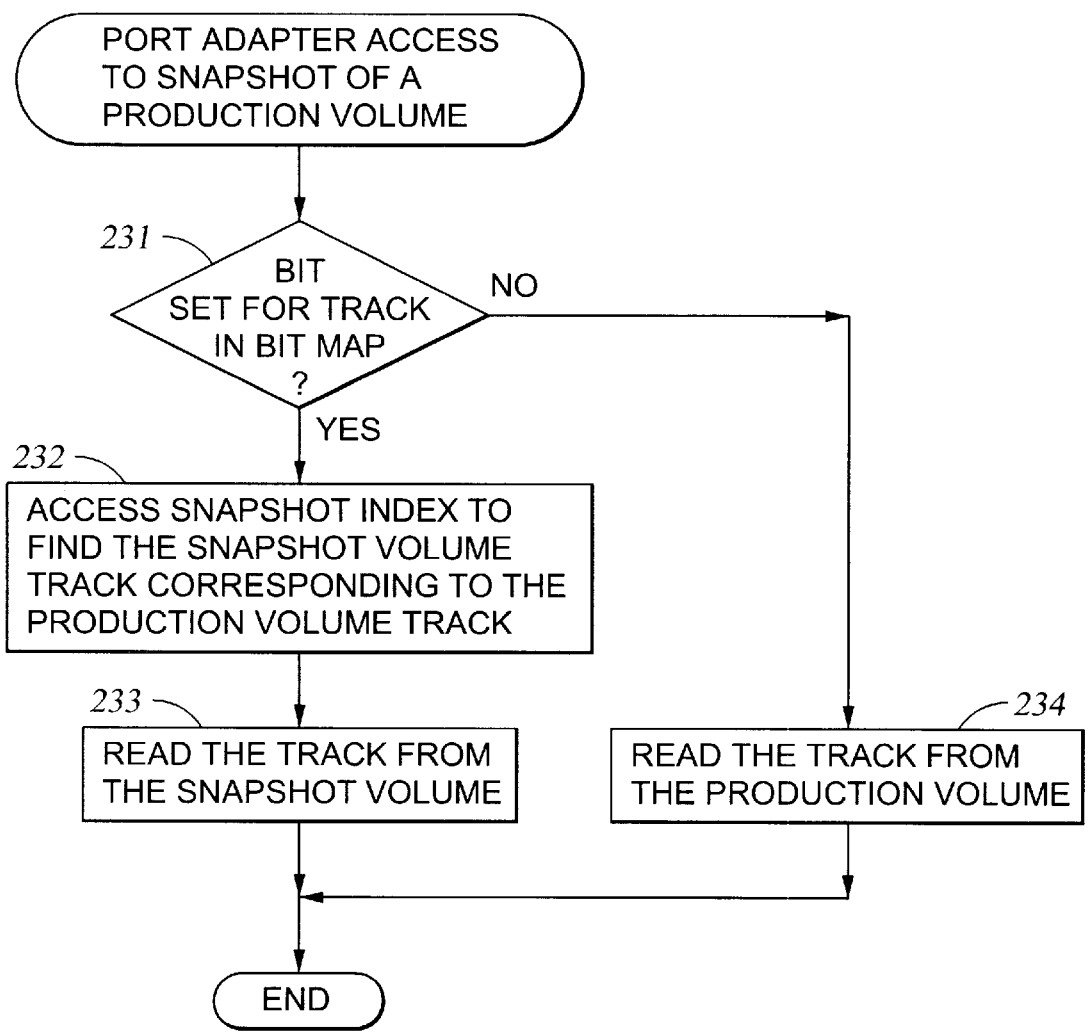
FIG. 17 is a flow chart of port adapter programming to permit access to a specified track in a snapshot copy of a production volume.

For debugging operations such as software simulation and testing, snapshot copies of files of interest can be made at various test points for inspection and comparison at a later time as problems are identified. In addition, the original contents of deleted or corrupted files can be restored from the snapshot copies. Shown in FIG. 17, for example, is a flowchart of a procedure programmed into a port adapter to give a host read access to a specified track of a snapshot of a production volume. In a first step 231, the port adapter inspects the bit for the track in the bitmap for the snapshot. If the bit for the track is set in the bit map, then execution continues from step 231 to step 232. In step 232, the port adapter accesses the index for the snapshot to find the snapshot volume number and the snapshot volume track number corresponding to the specified track of the snapshot of the production volume. Then in step 233, the track is read from the snapshot volume track, and the procedure of FIG. 17 is finished. If in step 231 the bit is not set for the track in the bit map, then execution branches to step 234. In step 234, the specified track is read from the production volume, and the procedure of FIG. 17 is finished.

What is claimed is:

1. In a data storage system including data storage, a method of maintaining in the data storage a snapshot copy of a production data set including a multiplicity of storage locations in the data storage, the production data set being accessible to a host processor for read/write access during maintenance of the snapshot copy, the snapshot copy including data existing in the production data set at a time when the snapshot copy is created, said method including:

the data storage system responding to a request from the host processor for a write operation upon a storage location of the production data set by checking whether or not the storage location of the production data set has been modified since the time when the snapshot copy was created, and upon finding that the storage location of the production data set has not been modified since the time when the snapshot copy was created, copying data from the storage location of the production data set to an allocated storage location of the snapshot copy, and after copying data from the storage location of the production data set to the allocated storage location of the snapshot copy, performing the write operation upon the storage location of the production data set, wherein the production data set includes at least a first production volume of tracks and a second production volume of tracks, the allocated storage location of the snapshot copy is in a snapshot volume of tracks, and the method further includes maintaining a first list of pointers to free tracks in the snapshot volume of tracks, maintaining a second list of pointers to tracks in the snapshot volume storing snapshot copies of tracks from the first production volume, and maintaining a third list of pointers to tracks in the snapshot volume storing snapshot copies of tracks from the second production volume, wherein the data storage system allocates a track in the snapshot copy volume in response to the request from the host processor for a write operation to a track in a respective one of the production volumes by removing a pointer from the first list of pointers to free tracks in the snapshot volume and inserting the pointer on a respective one of the second and third lists of pointers to tracks in the snapshot volume storing snapshot copies of tracks from the respective one of the production volumes.

2. A data storage system comprising data storage and at least one data processor responsive to requests from a host processor for read/write access to a production data set including multiple storage locations in the data storage, the data processor being programmed to maintain in the data storage a snapshot copy of the production data set, the snapshot copy including data existing in the production data set at a time when the snapshot copy is created, wherein the data processor is programmed to respond to a request from the host processor for a write operation upon a storage location of the production data set by checking whether or not the storage location of the production data set has been modified since the time when the snapshot copy was created, and upon finding that the storage location of the production data set has not been modified since the time when the snapshot copy was created, copying data from the storage location of the production data set to an allocated storage location of the snapshot copy, and after copying data from the storage location of the production data set to the allocated storage location of the snapshot copy, performing the write operation upon the storage location of the production data set, wherein the production data set includes at least a first production volume of tracks and a second production volume of tracks, the allocated storage location of the snapshot copy is in a snapshot volume of tracks, and wherein the data processor is programmed to maintain a first list of pointers to free tracks in the snapshot volume of tracks, to maintain a second list of pointers to tracks in the snapshot volume storing snapshot copies of tracks from the first production volume, and to maintain a third list of pointers to tracks in the snapshot volume storing snapshot copies of tracks from the second production volume, and wherein the data processor is programmed to allocate a track in the snapshot copy volume in response to the request from the host processor for a write operation to a track in a respective one of the production volumes by removing a pointer from the first list of pointers to free tracks in the snapshot volume and inserting the pointer on a respective one of the second and third lists of pointers to tracks in the snapshot volume storing snapshot copies of tracks from the respective one of the production volumes.

3. A program storage device containing a program for a data processor in a data storage system including data storage, the data processor being responsive to requests from a host processor for read/write access to a production data set including multiple storage locations in the data storage, the program being executable by the data processor for maintaining in the data storage a snapshot copy of the production data set, the production data set includes at least a first production volume of tracks and a second production volume of tracks, the snapshot copy including data existing in the production data set at a time when the snapshot copy is created, wherein the program is executable by the data processor for responding to a request from the host processor for a write operation upon a storage location of the production data set by checking whether or not the storage location of the production data set has been modified since the time when the snapshot copy was created, and upon finding that the storage location of the production data set has not been modified since the time when the snapshot copy was created, copying data from the storage location of the production data set to an allocated storage location of the snapshot copy, the allocated storage location of the snapshot copy being a track in a snapshot volume of tracks, and after copying data from the storage location of the production data set to the allocated storage location of the snapshot copy, performing the write operation upon the storage location of the production data set, wherein the program is executable by the data processor for maintaining a first list of pointers to free tracks in the snapshot volume of tracks, maintaining a second list of pointers to tracks in the snapshot volume storing snapshot copies of tracks from the first production volume, and maintaining a third list of pointers to tracks in the snapshot volume storing snapshot copies of tracks from the second production volume, and wherein the program is executable by the data processor for allocating a track in the snapshot copy volume in response to the request from the host processor for a write operation to a track in a respective one of the production volumes by removing a pointer from the first list of pointers to free tracks in the snapshot volume and inserting the pointer on a respective one of the second and third lists of pointers to tracks in the snapshot volume storing snapshot copies of tracks from the respective one of the production volumes.

4. In a data storage system including data storage, a method of maintaining in the data storage a snapshot copy of a production data set including a multiplicity of storage locations in the data storage, the production data set being accessible to a host processor for read/write access during maintenance of the snapshot copy, the snapshot copy including data existing in the production data set at a time when the snapshot copy is created, said method including:

the data storage system responding to a request from the host processor for a write operation upon a storage location of the production data set by checking whether or not the storage location of the production data set has been modified since the time when the snapshot copy was created, and upon finding that the storage location of the production data set has not been modified since the time when the snapshot copy was created, copying data from the storage location of the production data set to an allocated storage location of the snapshot copy, and after copying data from the storage location of the production data set to the allocated storage location of the snapshot copy, performing the write operation upon the storage location of the production data set, wherein the checking whether or not the storage location of the production data set has been modified since the time when the snapshot copy was created includes testing a bit for the storage location of the production data set, the bit being a bit of a bit map for the snapshot copy, and which includes migrating the snapshot copy from the data storage system to secondary storage by scanning the bit map, and for each bit in the bit map that indicates a storage location that has not been modified in the production data set, copying to the secondary storage data from the storage location that has not been modified in the production data set, and after scanning the bit map, transmitting data to the secondary storage from storage locations allocated to the snapshot copy.

5. The method as claimed in claim 4, which includes changing said each bit upon obtaining confirmation that the data from the storage location that has not been modified in the production data set has been copied to the secondary storage.

6. A data storage system comprising data storage and at least one data processor responsive to requests from a host processor for read/write access to a production data set including multiple storage locations in the data storage, the data processor being programmed to maintain in the data storage a snapshot copy of the production data set, the snapshot copy including data existing in the production data set at a time when the snapshot copy is created, wherein the data processor is programmed to respond to a request from the host processor for a write operation upon a storage location of the production data set by checking whether or not the storage location of the production data set has been modified since the time when the snapshot copy was created, and upon finding that the storage location of the production data set has not been modified since the time when the snapshot copy was created, copying data from the storage location of the production data set to an allocated storage location of the snapshot copy, and after copying data from the storage location of the production data set to the allocated storage location of the snapshot copy, performing the write operation upon the storage location of the production data set, wherein the checking whether or not the storage location of the production data set has been modified since the time when the snapshot copy was created includes testing a bit for the storage location of the production data set, the bit being a bit of a bit map for the snapshot copy, and wherein the data processor is programmed to migrate the snapshot copy from the data storage system to secondary storage by scanning the bit map, and for each bit in the bit map that indicates a storage location that has not been modified in the production data set, copying to secondary storage data from the storage location that has not been modified in the production data set, and after scanning the bit map, transmitting data to the secondary storage from storage locations allocated to the snapshot copy.

7. The data storage system as claimed in claim 6, wherein the data processor is programmed to change said each bit upon obtaining confirmation that the data from the storage location that has not been modified in the production data set has been copied to the secondary storage.

8. A program storage device containing a program for a data processor in a data storage system including data storage, the data processor being responsive to requests from a host processor for read/write access to a production data set including multiple storage locations in the data storage, the program being executable by the data processor for maintaining in the data storage a snapshot copy of the production data set, the snapshot copy including data existing in the production data set at a time when the snapshot copy is created, wherein the program is executable by the data processor for responding to a request from the host processor for a write operation upon a storage location of the production data set by checking whether or not the storage location of the production data set has been modified since the time when the snapshot copy was created, and upon finding that the storage location of the production data set has not been modified since the time when the snapshot copy was created, copying data from the storage location of the production data set to an allocated storage location of the snapshot copy, and after copying data from the storage location of the production data set to the allocated storage location of the snapshot copy, performing the write operation upon the storage location of the production data set, wherein the program is executable by the data processor for checking whether or not the storage location of the production data set has been modified since the time when the snapshot copy was created by testing a bit for the storage location of the production data set, the bit being a bit of a bit map for the snapshot copy, wherein the program is executable by the data processor for migrating the snapshot copy from the data storage system to secondary storage by scanning the bit map, and for each bit in the bit map that indicates a storage location that has not been modified in the production data set, copying to secondary storage data from the storage location that has not been modified in the production data set, and after scanning the bit map, transmitting data to the secondary storage from storage locations allocated to the snapshot copy.

9. The program storage device as claimed in claim 8, wherein the program is executable by the data processor for changing said each bit upon obtaining confirmation that the data from the storage location that has not been modified in the production data set has been copied to the secondary storage.

10. In a data storage system including data storage, a method of maintaining in the data storage a snapshot copy of a production data set, the production data set including a multiplicity of storage locations in the data storage, the production data set being accessible to a host processor for read/write access during maintenance of the snapshot copy, the snapshot copy including data existing in the production data set at a time when the snapshot copy is created, said method including:

the data storage system allocating to the snapshot copy a bit map for the data set and a list of pointers, the bit map including a bit for each storage location of the production data set to indicate whether or not said each storage location has been modified since the time when the snapshot copy is created, and the data storage system responding to a request from the host processor for a write operation upon a storage location of the production data set by checking the bit in the bit map for the storage location of the production data set to determine whether or not the storage location of the production data set has been modified since the time when the snapshot copy was created, and upon finding that the storage location of the production data set has not been modified since the time when the snapshot copy was created, allocating a storage location to the snapshot copy, copying data from the storage location of the production data set to the allocated storage location of the snapshot copy, placing a pointer to the allocated storage location of the snapshot copy on the list of pointers allocated to the snapshot copy, changing the bit in the bit map for the storage location of the production data set, and after copying data from the storage location of the production data set to the allocated storage location of the snapshot copy, performing the write operation upon the storage location of the production data set, which includes migrating the snapshot copy from the data storage system to secondary storage by scanning the bit map, and for each bit in the bit map that indicates a storage location of the production data set that has not been modified since the time when the snapshot copy was created, copying to the secondary storage data from the storage location of the production data set that has not been modified since the time when the snapshot copy was created, and after scanning the bit map, transmitting data to the secondary storage from storage locations allocated to the snapshot copy.

11. A data storage system comprising data storage and at least one data processor responsive to requests from a host processor for read/write access to a production data set including multiple storage locations in the data storage, the data processor being programmed to maintain in the data storage a snapshot copy of the production data set, the snapshot copy including data existing in the production data set at a time when the snapshot copy is created, wherein the data processor is programmed to allocate to the snapshot copy a bit map for the data set and a list of pointers, the bit map including a bit for each storage location of the production data set to indicate whether or not said each storage location has been modified since the time when the snapshot copy is created, and wherein the data processor is programmed to respond to a request from the host processor for a write operation upon a storage location of the production data set by checking the bit in the bit map for the storage location of the production data set to determine whether or not the storage location of the production data set has been modified since the time when the snapshot copy was created, and upon finding that the storage location of the production data set has not been modified since the time when the snapshot copy was created, allocating a storage location to the snapshot copy, copying data from the storage location of the production data set to the allocated storage location of the snapshot copy, placing a pointer to the allocated storage location of the snapshot copy on the list of pointers allocated to the snapshot copy, changing the bit in the bit map for the storage location of the production data set, and after copying data from the storage location of the production data set to the allocated storage location of the snapshot copy, performing the write operation upon the storage location of the production data set, wherein the data processor is programmed to migrate the snapshot copy from the data storage system to secondary storage by scanning the bit map, and for each bit in the bit map that indicates a storage location of the production data set that has not been modified since the time when the snapshot copy was created, copying to the secondary storage data from the storage location of the production data set that has not been modified since the time when the snapshot copy was created, and after scanning the bit map, transmitting data to the secondary storage from storage locations allocated to the snapshot copy.

12. The data processor as claimed in claim 11, wherein the data processor is programmed to change said each bit upon obtaining confirmation that the data from the storage location that has not been modified in the production data set has been copied to the secondary storage.

13. A program storage device containing a program for a data processor in a data storage system including data storage, the data processor being responsive to requests from a host processor for read/write access to a production data set including multiple storage locations in the data storage, the program being executable by the data processor for maintaining in the data storage a snapshot copy of the production data set, the snapshot copy including data existing in the production data set at a time when the snapshot copy is created, wherein the program is executable by the data processor for allocating to the snapshot copy a bit map for the data set and a list of pointers, the bit map including a bit for each storage location of the production data set to indicate whether or not said each storage location has been modified since the time when the snapshot copy is created, and wherein the program is executable by the data processor for responding to a request from the host processor for a write operation upon a storage location of the production data set by checking the bit in the bit map for the storage location of the production data set to determine whether or not the storage location of the production data set has been modified since the time when the snapshot copy was created, and upon finding that the storage location of the production data set has not been modified since the time when the snapshot copy was created, allocating a storage location to the snapshot copy, copying data from the storage location of the production data set to the allocated storage location of the snapshot copy, placing a pointer to the allocated storage location of the snapshot copy on the list of pointers allocated to the snapshot copy, changing the bit in the bit map for the storage location of the production data set, and after copying data from the storage location of the production data set to the allocated storage location of the snapshot copy, performing the write operation upon the storage location of the production data set, wherein the program is executable by the data processor for migrating the snapshot copy from the data storage system to secondary storage by scanning the bit map, and for each bit in the bit map that indicates a storage location of the production data set that has not been modified since the time when the snapshot copy was created, copying to the secondary storage data from the storage location of the production data set that has not been modified since the time when the snapshot copy was created, and after scanning the bit map, transmitting data to the secondary storage from storage locations allocated to the snapshot copy.

14. The program storage device as claimed in claim 13, wherein the program is executable by the data processor for changing said each bit upon obtaining confirmation that the data from the storage location that has not been modified in the production data set has been copied to the secondary storage.

* * * * *